US012581256B2

(12) United States Patent
Wilberding et al.

(10) Patent No.: US 12,581,256 B2
(45) Date of Patent: Mar. 17, 2026

(54) SYSTEMS AND METHODS FOR COORDINATED PLAYBACK OF ANALOG AND DIGITAL MEDIA CONTENT

(71) Applicant: Sonos, Inc., Santa Barbara, CA (US)

(72) Inventors: Dayn Wilberding, Portland, OR (US); Adam Kumpf, Delaware, OH (US); Dana Krieger, Emeryville, CA (US); Philippe Vossel, Wuppertal (DE); Russell Prince, Madison, WI (US); Ryan Purdy, Santa Barbara, CA (US); Thomas Schoeniger, Santa Barbara, CA (US); Sabrina Sexton, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 168 days.

(21) Appl. No.: 18/397,374

(22) Filed: Dec. 27, 2023

(65) Prior Publication Data

US 2024/0223978 A1 Jul. 4, 2024

Related U.S. Application Data

(60) Provisional application No. 63/601,482, filed on Nov. 21, 2023, provisional application No. 63/477,817, filed on Dec. 29, 2022.

(51) Int. Cl.
*H04R 27/00* (2006.01)
*G06F 3/16* (2006.01)
*H02J 50/00* (2016.01)

(52) U.S. Cl.
CPC ............. *H04R 27/00* (2013.01); *G06F 3/165* (2013.01); *H02J 50/00* (2016.02); *H04R 2227/005* (2013.01)

(58) Field of Classification Search
CPC ......... G06F 3/165; G08B 21/18; G10L 17/22; G10L 25/51; G10L 13/08; G10L 15/28;
(Continued)

(56) References Cited

U.S. PATENT DOCUMENTS

| 5,440,644 | A | 8/1995 | Farinelli et al. |
| 5,761,320 | A | 6/1998 | Farinelli et al. |

(Continued)

FOREIGN PATENT DOCUMENTS

| EP | 1389853 | A1 | 2/2004 |
| WO | 200153994 | | 7/2001 |
| WO | 2003093950 | A2 | 11/2003 |

OTHER PUBLICATIONS

AudioTron Quick Start Guide, Version 1.0, Mar. 2001, 24 pages.
(Continued)

*Primary Examiner* — Gerald Gauthier
(74) *Attorney, Agent, or Firm* — Fortem IP LLP

(57) ABSTRACT

Media playback systems configured to playback media content based on provider (e.g., artist, musician, creator) intent are disclosed. In one example, a media playback system detects a trigger condition while playing back first media content via one or more playback devices from a first media content source. The system determines, based on the detected trigger condition, one or more instructions associated with a provider of the first media content. Based on the one or more instructions the system can cause playback of second media content via at least one of the one or more playback devices.

17 Claims, 17 Drawing Sheets

(58) Field of Classification Search

CPC ...... H02J 50/00; H04L 12/2854; H04L 67/10; H04L 67/04; H04N 9/8063; H04N 21/43615; H04N 21/6547; H04N 5/2628; H04R 1/028; H04R 3/04; H04R 27/00; H04R 29/001; H04R 2227/005; H04R 2420/01; H04R 3/12; H04R 5/04; H04R 29/007; G06Q 30/08; H04S 1/002; H04S 3/008; H04S 7/30; H04W 8/005

See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,014,834 | B2 * | 4/2015 | Kallai ...................... H04R 3/12 700/94 |
| 10,001,965 | B1 * | 6/2018 | Lang ...................... H04R 27/00 |
| 10,433,058 | B1 * | 10/2019 | Torgerson ............... G06F 3/165 |
| 10,681,460 | B2 * | 6/2020 | Woo ......................... G10L 15/28 |
| 10,735,803 | B2 * | 8/2020 | Jackson ................... G06F 3/165 |
| 11,188,294 | B2 * | 11/2021 | Wilberding ............ G06F 3/165 |
| 11,922,955 | B2 * | 3/2024 | Jackson ................... H04S 3/008 |
| 12,010,492 | B2 * | 6/2024 | Wilberding .............. H04R 3/12 |
| 12,284,500 | B2 * | 4/2025 | Wilberding .............. H04R 3/12 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2006/0024024 | A1 * | 2/2006 | Chen ................... H04N 9/8063 386/E9.017 |
| 2007/0142944 | A1 | 6/2007 | Goldberg et al. |
| 2008/0163743 | A1 * | 7/2008 | Freedman .............. G06Q 30/08 84/609 |
| 2009/0307375 | A1 * | 12/2009 | Mccarthy ................ H04L 67/04 709/248 |
| 2012/0144435 | A1 * | 6/2012 | Spilo ................ H04N 21/43615 725/78 |
| 2015/0120953 | A1 * | 4/2015 | Crowe ............... H04N 21/6547 709/231 |

| | | | |
|---|---|---|---|
| 2015/0222993 | A1 * | 8/2015 | Ramos ..................... H04R 3/04 381/99 |
| 2016/0021457 | A1 * | 1/2016 | Labana .................. H04R 27/00 381/80 |
| 2016/0026428 | A1 * | 1/2016 | Morganstern ........... H04L 67/10 700/94 |
| 2016/0212722 | A1 * | 7/2016 | Millington .......... H04L 12/2854 |
| 2017/0048632 | A1 * | 2/2017 | Bender ................... H04R 5/04 |
| 2017/0242651 | A1 * | 8/2017 | Lang .................... H04R 29/007 |
| 2018/0047414 | A1 * | 2/2018 | Kasilya Sudarsan .. G08B 21/18 |
| 2018/0225084 | A1 * | 8/2018 | Lin .......................... H04R 3/04 |
| 2019/0236416 | A1 * | 8/2019 | Wang ...................... G10L 17/22 |
| 2020/0162820 | A1 * | 5/2020 | Kallai ...................... H04S 7/30 |
| 2020/0349230 | A1 * | 11/2020 | Yoshioka ............... G10L 25/51 |
| 2021/0050007 | A1 * | 2/2021 | Millington ............. G06F 3/165 |
| 2022/0045715 | A1 * | 2/2022 | Curtis .................... H04R 1/028 |
| 2022/0417660 | A1 * | 12/2022 | Wilberding ............ H04R 27/00 |
| 2023/0054164 | A1 * | 2/2023 | Lang ..................... H04W 8/005 |
| 2023/0113703 | A1 * | 4/2023 | Eubank ............... H04R 29/001 381/303 |
| 2024/0223978 | A1 * | 7/2024 | Wilberding ............. H02J 50/00 |
| 2024/0242724 | A1 * | 7/2024 | Jackson ................... H04S 3/008 |
| 2024/0314496 | A1 * | 9/2024 | Chamness ............... H04S 1/002 |
| 2024/0323606 | A1 * | 9/2024 | Wilberding .............. H04R 3/12 |
| 2025/0234133 | A1 * | 7/2025 | Wilberding .............. H04R 3/12 |
| 2025/0234144 | A1 * | 7/2025 | Wilberding ............ H04R 27/00 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D M Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

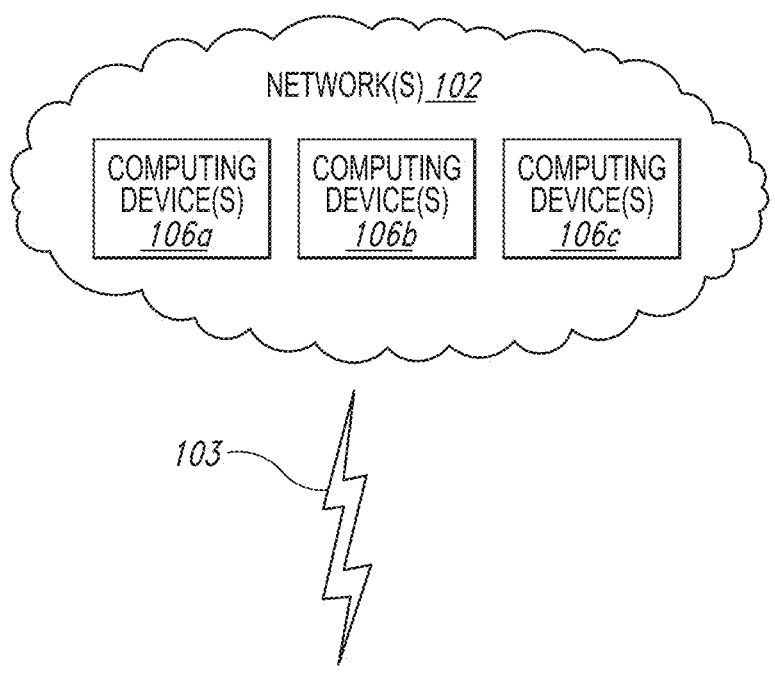
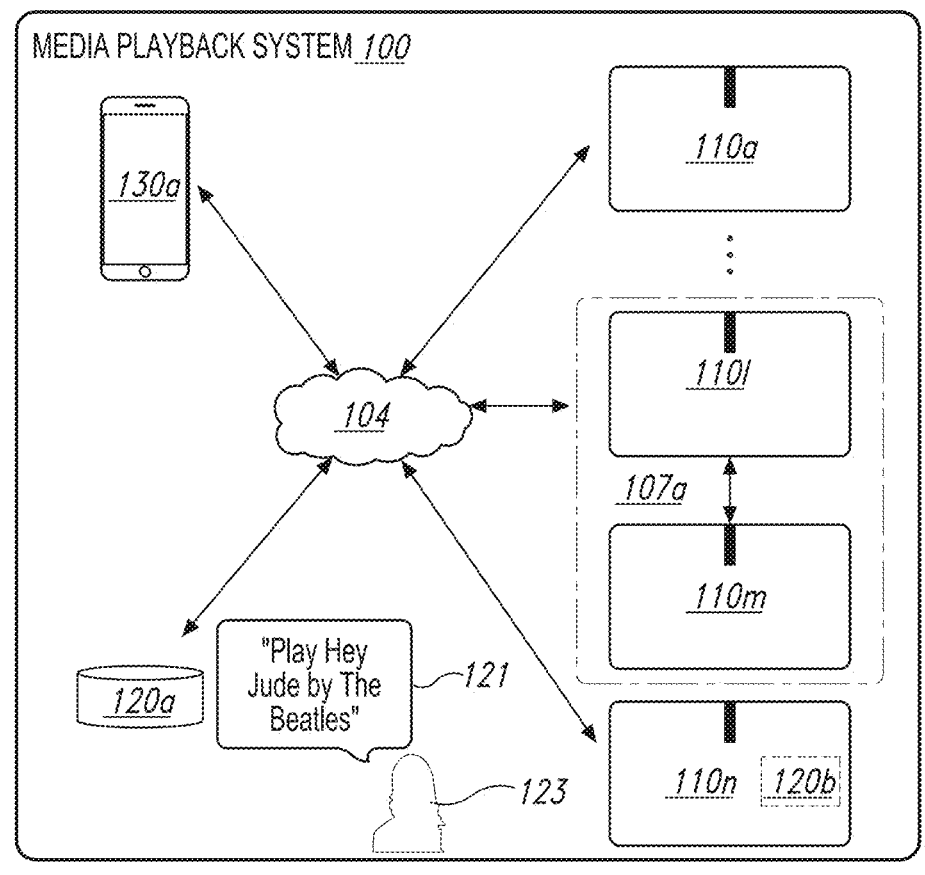
*Fig. 1B*

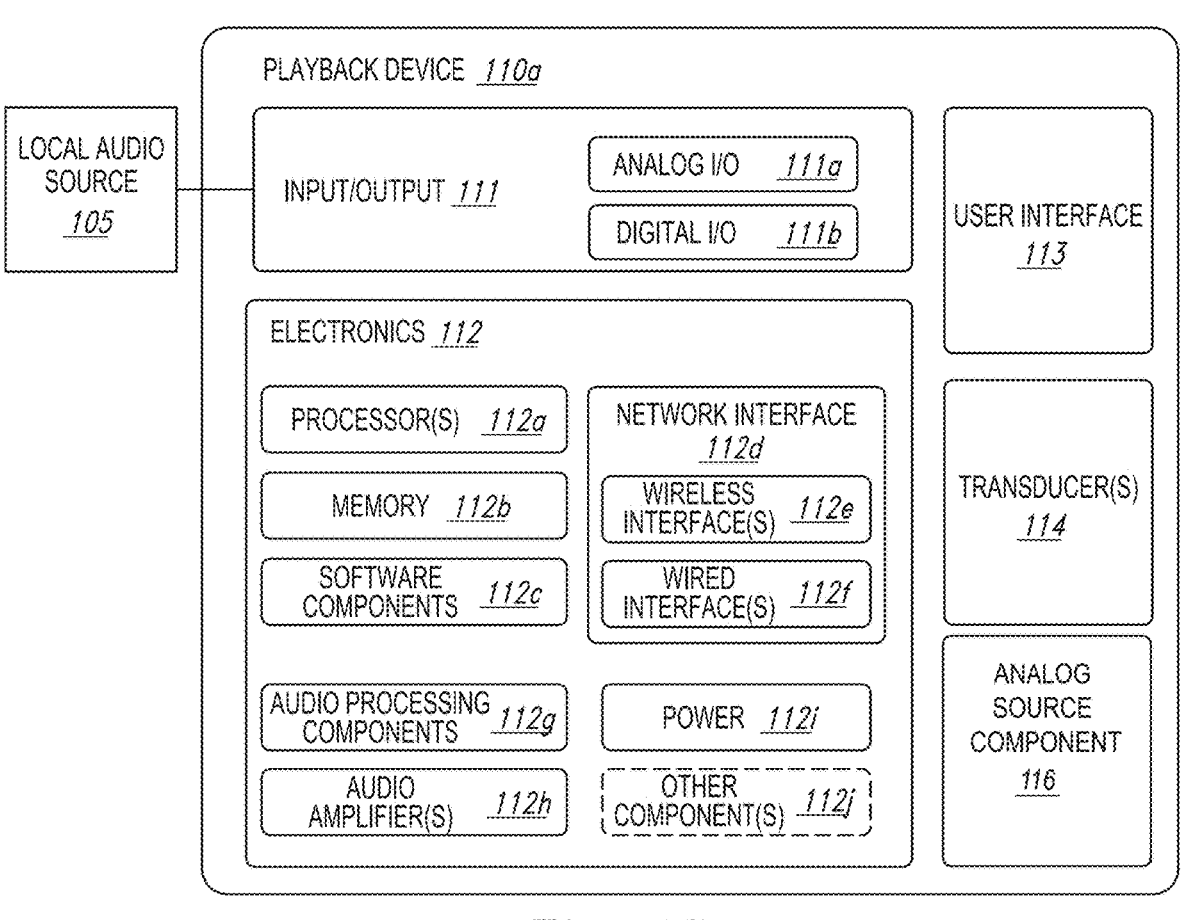
Fig. 1C
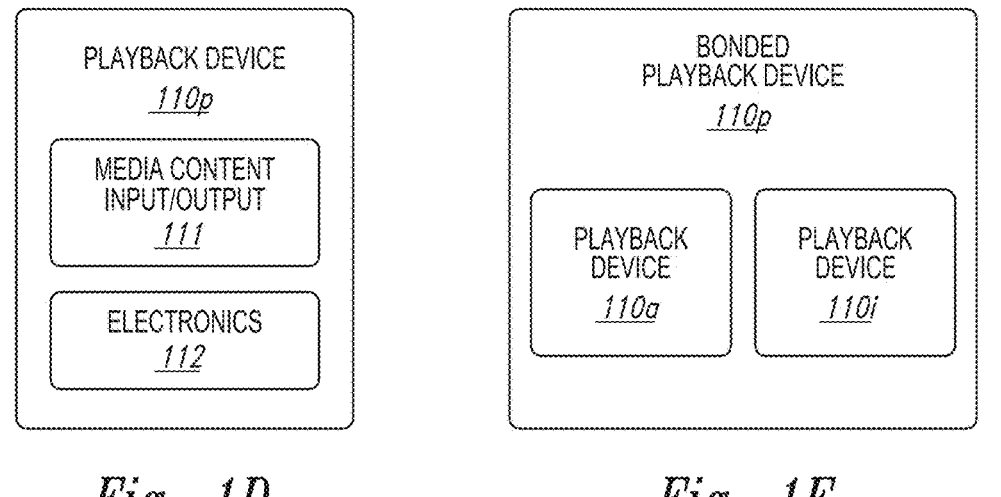
Fig. 1D                    Fig. 1E

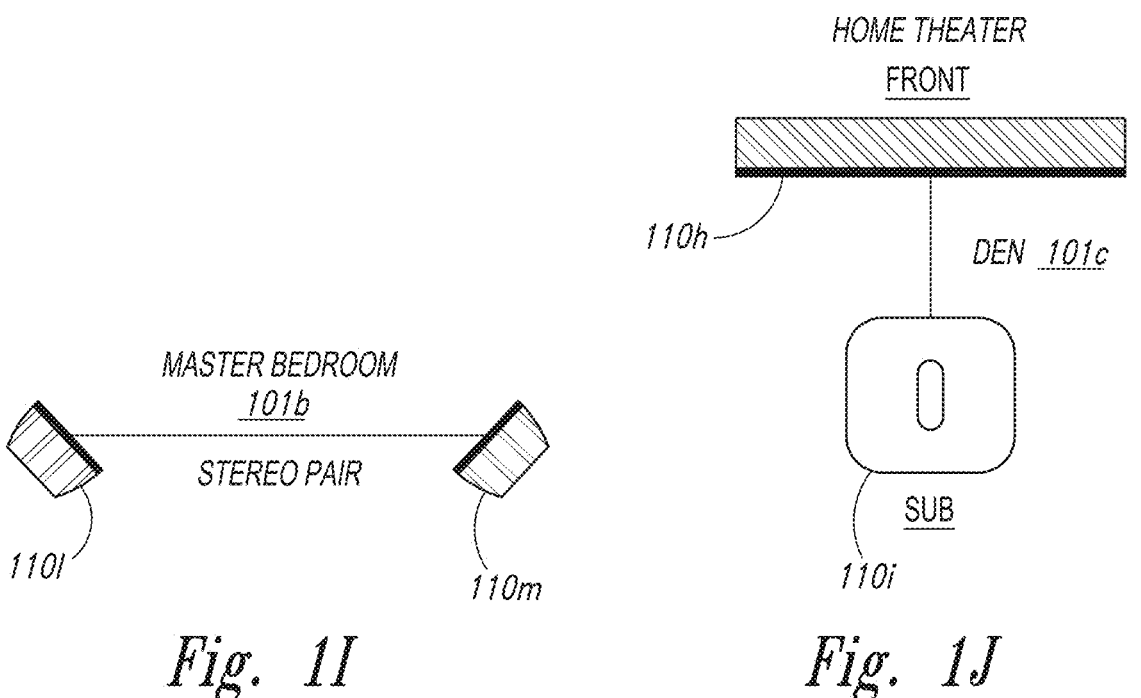
*MASTER BEDROOM*
*101b*
*STEREO PAIR*
*110l*          *110m*
*Fig. 1I*
HOME THEATER
FRONT
*110h*
DEN  *101c*
SUB
*110i*
*Fig. 1J*
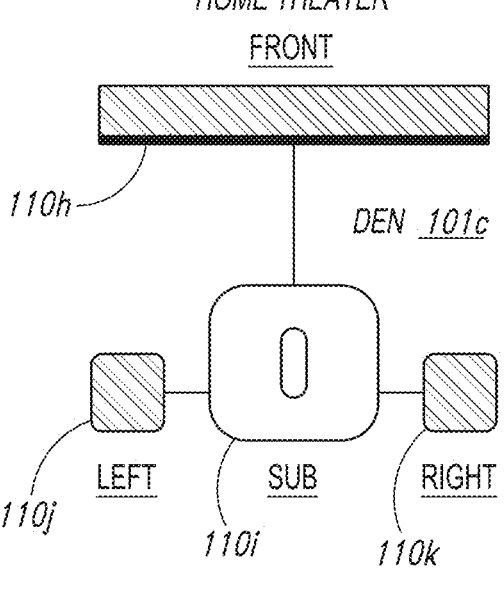
HOME THEATER
FRONT
*110h*
DEN  *101c*
LEFT      SUB      RIGHT
*110j*     *110i*     *110k*
*Fig. 1K*
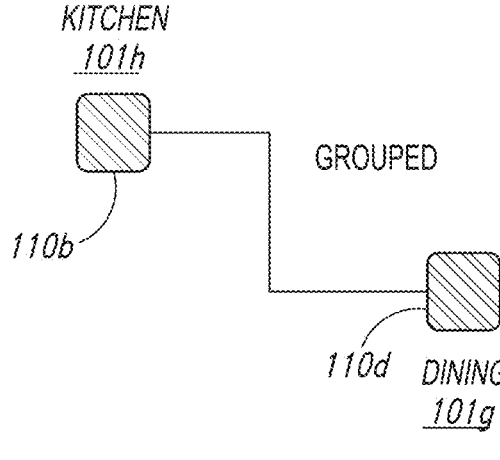
KITCHEN
*101h*
GROUPED
*110b*
*110d*   DINING
*101g*
*Fig. 1L*

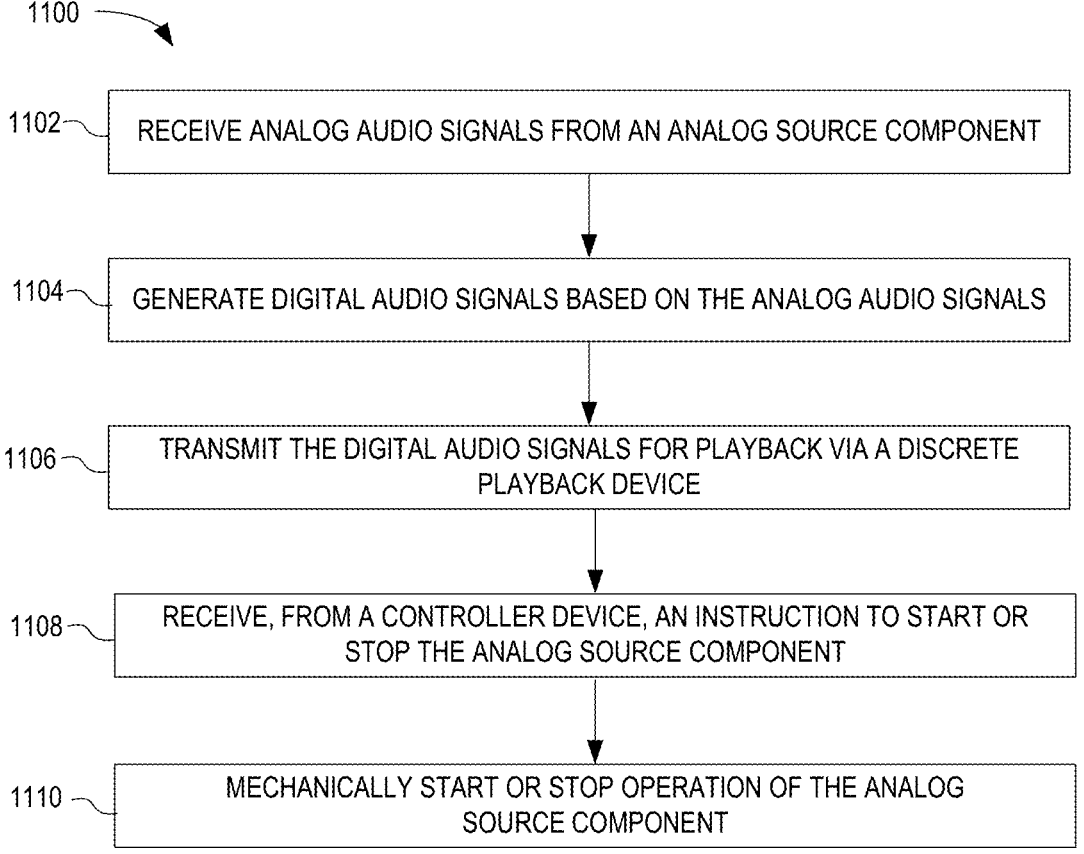

1100

1102 — RECEIVE ANALOG AUDIO SIGNALS FROM AN ANALOG SOURCE COMPONENT

1104 — GENERATE DIGITAL AUDIO SIGNALS BASED ON THE ANALOG AUDIO SIGNALS

1106 — TRANSMIT THE DIGITAL AUDIO SIGNALS FOR PLAYBACK VIA A DISCRETE PLAYBACK DEVICE

1108 — RECEIVE, FROM A CONTROLLER DEVICE, AN INSTRUCTION TO START OR STOP THE ANALOG SOURCE COMPONENT

1110 — MECHANICALLY START OR STOP OPERATION OF THE ANALOG SOURCE COMPONENT

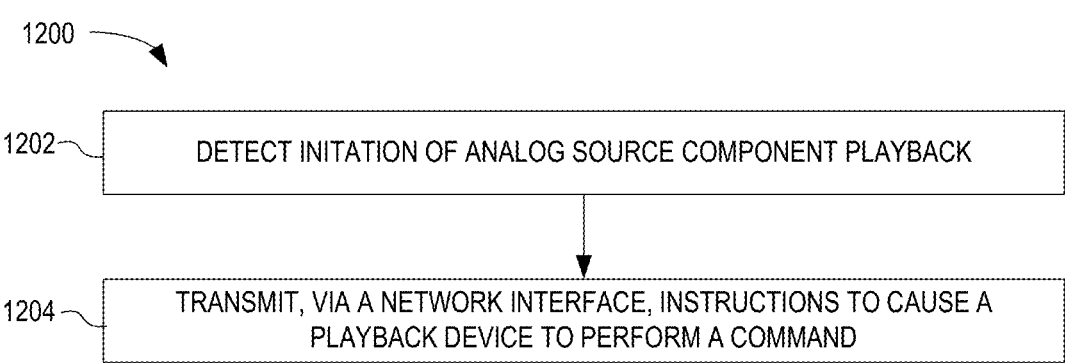

1202 — DETECT INITATION OF ANALOG SOURCE COMPONENT PLAYBACK

1204 — TRANSMIT, VIA A NETWORK INTERFACE, INSTRUCTIONS TO CAUSE A PLAYBACK DEVICE TO PERFORM A COMMAND

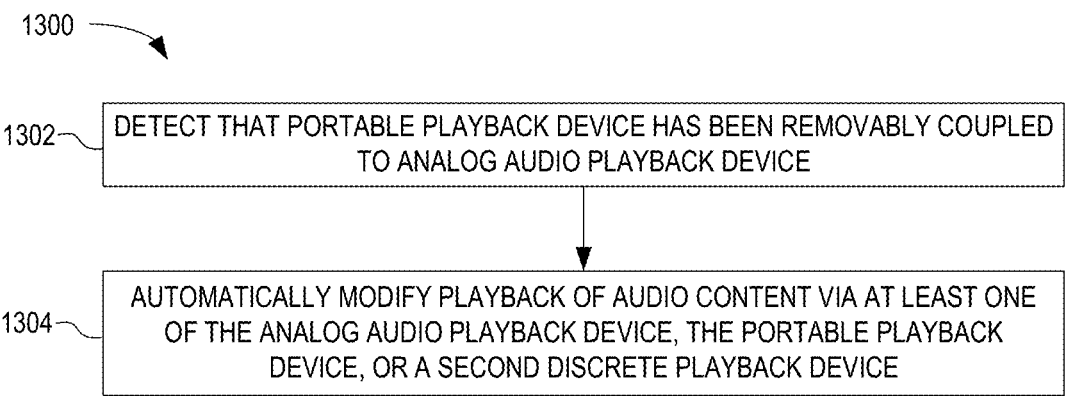

1302 — DETECT THAT PORTABLE PLAYBACK DEVICE HAS BEEN REMOVABLY COUPLED TO ANALOG AUDIO PLAYBACK DEVICE

1304 — AUTOMATICALLY MODIFY PLAYBACK OF AUDIO CONTENT VIA AT LEAST ONE OF THE ANALOG AUDIO PLAYBACK DEVICE, THE PORTABLE PLAYBACK DEVICE, OR A SECOND DISCRETE PLAYBACK DEVICE

Detect trigger associated with first media content

1404

Determine provider intent associated with first media content and/or detected trigger

1406

Based on provider intent, cause corresponding action(s)

SYSTEMS AND METHODS FOR COORDINATED PLAYBACK OF ANALOG AND DIGITAL MEDIA CONTENT

CROSS-REFERENCE TO RELATED APPLICATIONS

This application claims priority to U.S. Patent Application No. 63/477,817, filed Dec. 29, 2022, and to U.S. Patent Application No. 63/601,482, filed Nov. 21, 2023, each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 9-14 are flow diagrams illustrating example methods in accordance with the disclosed technology.

Figure 1A:
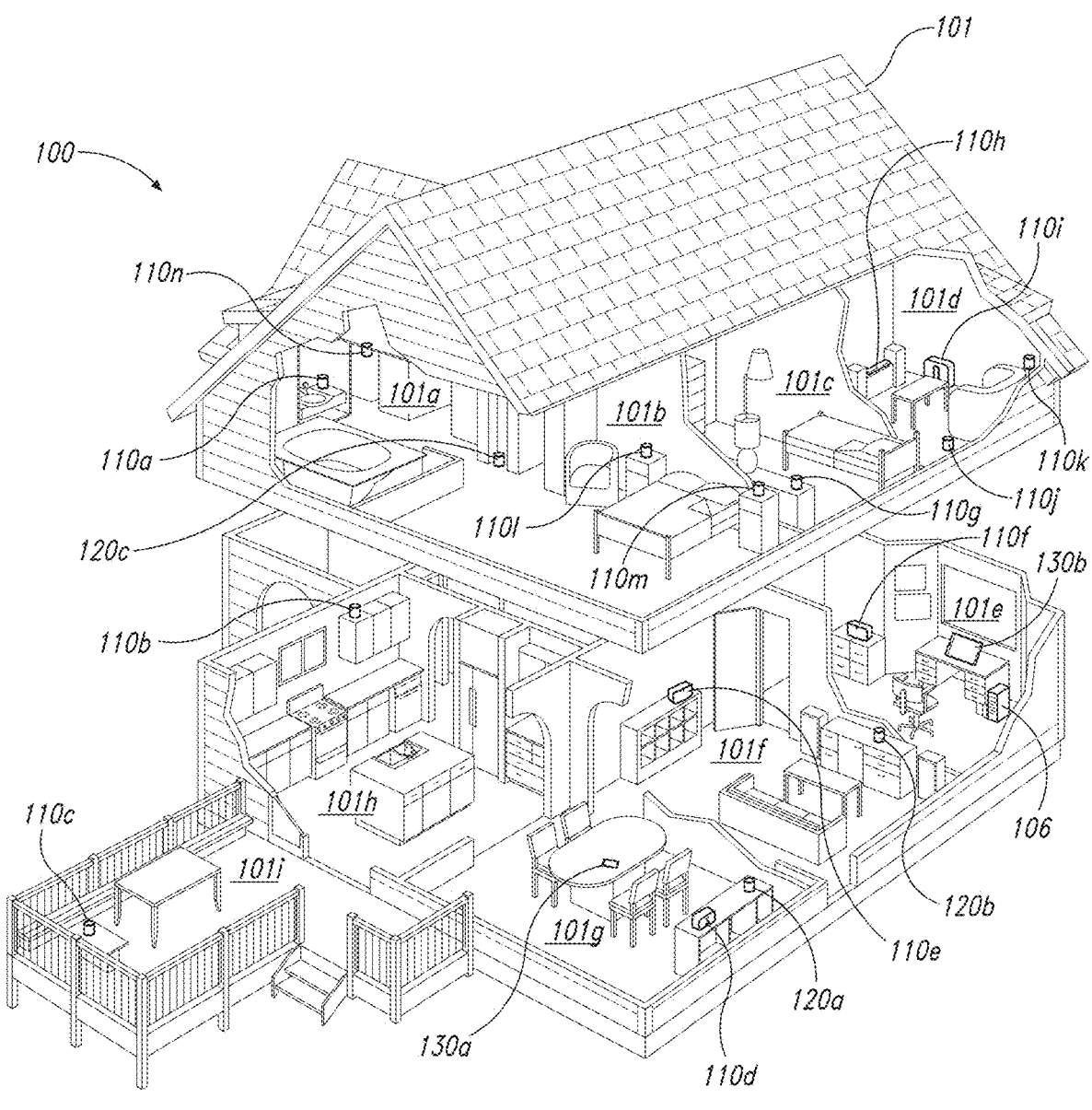
FIG. 1A is a partial cutaway view of an environment having a media playback system configured in accordance with examples of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Over the past several years, vinyl LPs have made a resurgence as a music playback format. Despite the format's objective technical deficiencies, many listeners enjoy the experience of listening to an LP. There are many solutions for integrating vinyl playback into a multi-room wireless platform, such as a Sonos system. These solutions, however, often lack intuitive controls and convenience features. Additionally, it can be cumbersome to coordinate between playback of vinyl or other analog content and playback of digital content streamed over a network interface. Several examples of the present technology can enhance the listening experience of playing back LPs or other analog (or digital) media content, in particular when integrated with a smart media playback system.

One experience in particular relates to when a particular media item (e.g., an album, song, playlist, podcast) reaches its end. Under conventional approaches, playback typically stops, which can lead to a very unsatisfying pause or end of the music.

In some examples, rather than stopping playback, the system or media content provider may automatically choose another media item and continue playback accordingly. There may be problems associated with this approach, however, since the system may determine the follow-on media content based on parameters (e.g., media item characteristics, user listening history, device(s) contextual information) that may not align with artist intent. Since the transition between the particular media item(s) and the follow-on media content is meant to be seamless, listeners may associate the follow-on content with the artist's original work, which could negatively impact how the listeners perceive the artist(s).

To address these and other problems, the disclosed technology incorporates provider intent when determining follow-on media content. As used herein, provider may refer to one or more artists, musicians, writers, producers, recording engineers, curators associated with a particular media items (or set of media items), or any other individual(s) associated with the creation, production, generation, and/or curation of the particular media item(s). In the case of a song, playlist, album, podcast, etc., it is expected that the artists associated with the creation of the particular media item(s) would be involved in determining the provider intent. In certain examples, however, a particular media item, such as a song, may actually be written by one artist (or artists) and performed by a separate set of musicians. In these scenarios, the provider may include the writing artist, the musician(s), or both (or neither). In certain scenarios, however, an anthology or compilation may be assembled by a curator who could be considered the provider.

When a particular media item reaches its end (or perhaps another portion of the content), the system can select follow-on media content based on provider intent. For instance, at the end of an LP, the system may, based on provider instructions, begin playback of another media item or set of media items that may include additional content from the same provider(s) or perhaps content related to the original particular media item. In one example, the particular media item(s) may include a cover of another artist's song(s) and the provider instructions may include playing back the original version (or perhaps another version of the song). In some instances, the original or other version may play back at the end of a full set of media item(s) (e.g., album or playlist). In other scenarios, however, the original or other version may play immediately after the provider's version in the list of items, or may even precede playback of the provider's version.

As described in further detail below, in some examples, the system, based on provider intent, may transition playback from one hardware source/input (e.g., an analog source such as an LP player) to another hardware source/input (e.g., an HDMI input). In some examples, based on provider intent, the system may generate novel content (e.g., algorithmically generated content such as a soundscape) rather than explicitly switching from a hardware source/input or vice versa. In certain examples, switching inputs or otherwise transitioning playback between inputs based on provider intent may include additional devices and/or scenes. For instance, a lighting scene may be invoked based on provider intent during a transition between one input (or media content source, media content type, media track, media program, etc.) and another.

These and other features described herein improve upon earlier-developed systems and methods including, for example the systems and methods disclosed and described in the following earlier-filed patent applications assigned to Sonos, Inc., each of which is hereby incorporated by reference in its entirety.

U.S. application Ser. No. 14/377,770, titled "Audio Settings," filed on Jul. 22, 2014, and issued on Jun. 14, 2016, as U.S. Pat. No. 9,367,283 ("Kuper '283"), describes, among other features, example configurations in which audio setting(s) are identified based on provider intent and media content is played back according to the identified audio setting(s).

U.S. application Ser. No. 16/805,130, titled "Playback Transitions," filed on Feb. 28, 2020, and issued on Jun. 7, 2022, as U.S. Pat. No. 11,356,777 ("Wilberding '777"), describes, among other features, example configurations in which playback of media content via a particular source input is transitioned from one or more playback devices to a different one or more playback devices based on a detected trigger condition (e.g., a long press on a button or other user input).

US application Ser. No. 17/808,169, titled "Systems And Methods For Coordinated Playback Of Analog And Digital Media Content" describes, among other features, devices and systems that retrieve, from a media content provider, "follow-on" media content related to a particular LP (or other media item(s)) being played back seamlessly play back the retrieved content. The result is audio playback output continues with little or no indication to the listener(s) of a transition. In some scenarios, this is particularly beneficial as the music never stops despite the end of an LP having been reached.

International App. PCT/US2021/072454 titled "Playback Of Generative Media Content," filed Nov. 17, 2021 describes, among other features, generation of novel content based on user contextual information or other user input.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio, visual content, or both audio and visual content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable. In some embodiments, a playback device includes a display component (e.g., a screen, projector, etc.) or is otherwise communicatively coupled to a display component for the playback of visual content.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples and examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*c*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

FIG. 1B is a schematic diagram of the media playback system 100 and a cloud network 102. For case of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for instance, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a stand-alone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some examples, for instance, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

As shown in FIG. 1C, the playback device 110a can also include an analog source component 116. In various examples, the analog source component 116 can be integrated into the same housing or operably coupled to other components while itself positioned in a separate housing or enclosure. The analog source component 116 can be, for example, any suitable component or set of components configured to facilitate playback of analog media content such as vinyl records, magnetic tape cassettes, or other such analog content. In some examples, the analog source component 116 can take the form of a turntable-style record player (e.g., including a rotatable platter and a tonearm carrying a cartridge and stylus or needle). As described in more detail elsewhere herein, the analog source component 116 can be used to enable playback of physical, analog media content (e.g., vinyl LPs) while also providing additional functionality as compared to conventional analog playback devices.

Additionally, the playback device 110a can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some examples, the playback device 110a optionally includes one or more microphones 115 (e.g., a single microphone, a plurality of microphones, a microphone array) (hereinafter referred to as "the microphones 115"). In certain examples, for instance, the playback device 110a having one or more of the optional microphones 115 can operate as an NMD configured to receive voice input from a user and correspondingly perform one or more operations based on the received voice input.

In the illustrated example of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some examples, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some examples, the operations further include causing the playback device 110a to send audio data to another one of the playback devices 110a and/or another device (e.g., one of the NMDs 120). Certain examples include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some examples, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some examples, for instance, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, for instance, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

The playback device 110*a* can also optionally include display components 112*k* that are configured to play back visual content (e.g., video), either accompanying audio playback or independently of any audio playback. In various examples, these display components 112*k* can include video display elements and associated electronics. Examples of suitable display elements include a display screen (e.g., liquid crystal display (LCD), light-emitting diode (LED) display, organic LED (OLED) display, etc.), a projector, a heads-up display, a wearable display (e.g., smart glasses, a smart watch, etc.), or any other suitable display technology that can play back visual content for viewing by one or more users. In some examples, the playback device 110*a* includes the display components 112*k* integrated within the same housing, for example in the case of a smart television or other such device. Additionally or alternatively, the playback device 110*a* can include display components 112*k* that are separate from but communicatively coupled to other elements of the playback device. For example, the playback device 110*a* can take the form of a soundbar that is communicatively coupled (e.g., via wired or wireless connection) to a television or other display component. In some examples, the playback device 110*a* can take the form of a dongle, set-top box, or other such discrete electronic component that can be communicatively coupled to a video display component such as a television, whether via a wired or wireless connection.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for instance, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figures 1F, 1G, 1H:
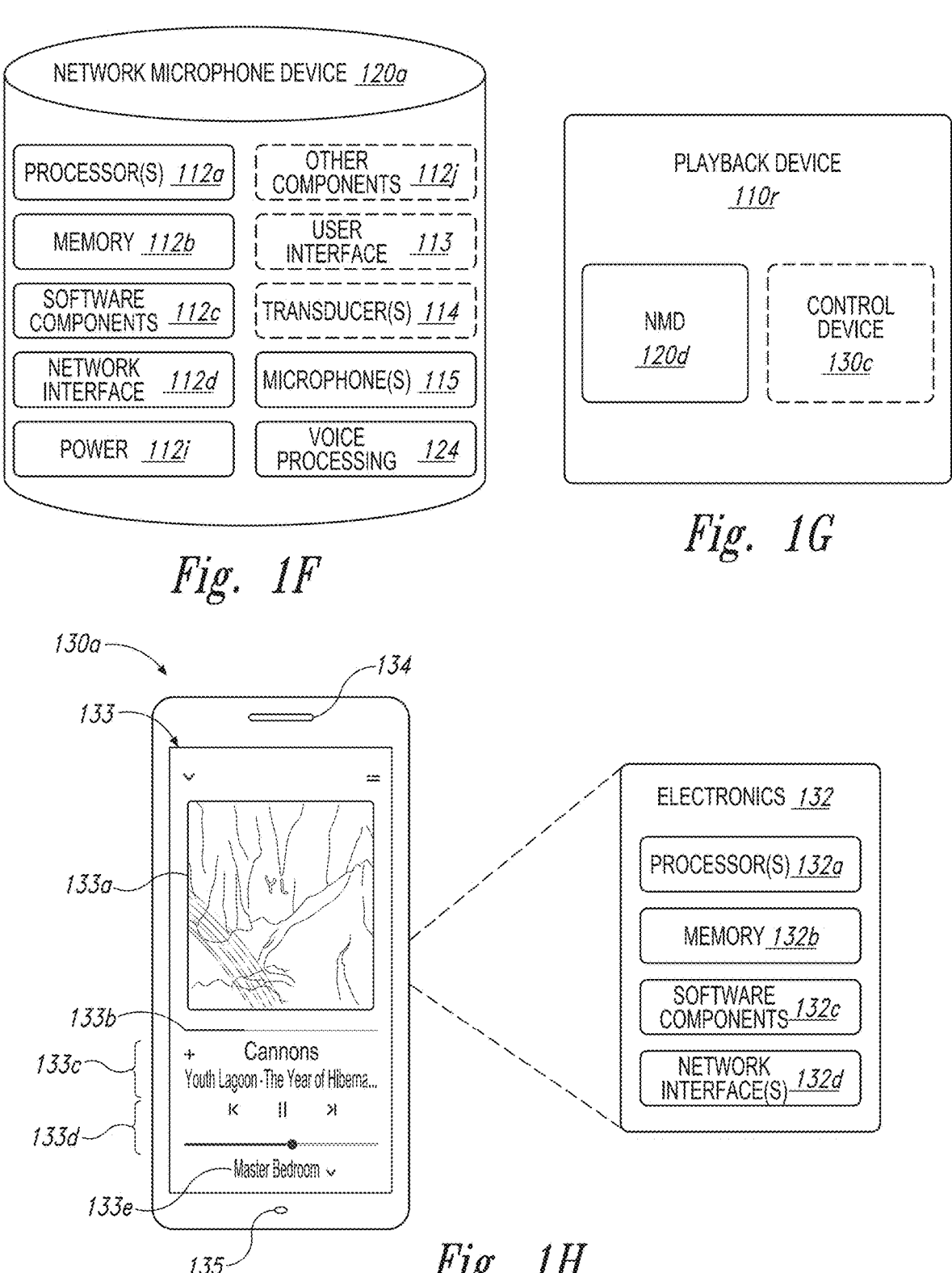
FIG. 1F is a block diagram of a network microphone device.
FIG. 1G is a block diagram of a playback device.
FIG. 1H is a partially schematic diagram of a control device.
Figure 1M:
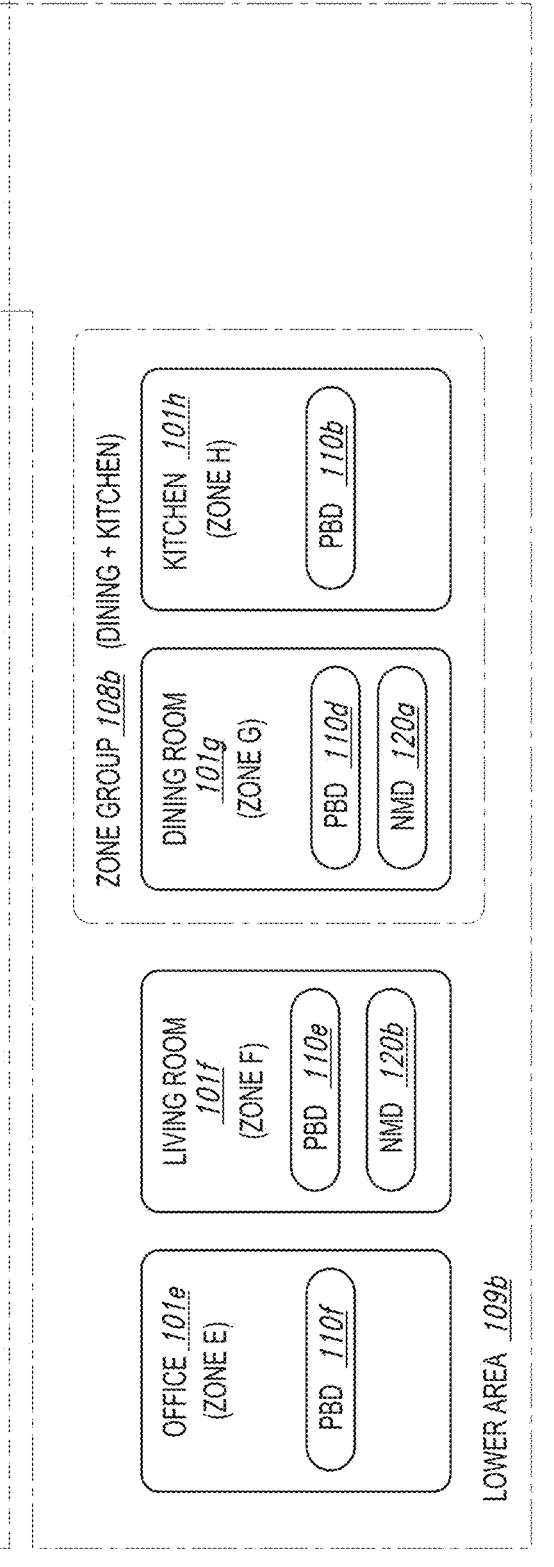
FIG. 1B is a schematic diagram of the media playback system of FIG. 1A and one or more networks.
FIG. 1C is a block diagram of a playback device.
FIG. 1D is a block diagram of a playback device.
FIG. 1E is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for instance, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™", an Android phone)

on which media playback system controller application software is installed. In some examples, the control device 130*a* comprises, for example, a tablet (e.g., an iPad"), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

As described in more detail below, in various examples the control device 130 can be configured to control or otherwise interact with video playback via a playback device 110. In some examples, the control device 130 can be used to control video playback via the playback device (e.g., selecting video content or other such media content for playback). Additionally or alternatively, the control device 130 can be used to present supplemental content to the user during video playback via the playback device 110. For example, the user may initiate, via the control device 130, playback of a television show on a playback device 110 (e.g., a smart television). During playback of the television show, supplemental content (e.g., other recommended shows, cast list, friends' ratings, etc.) can be presented to the user via the interface 133 of the control device 130. In some examples, multiple control devices 130 can be used by the same or different users within the same environment to control the same playback device(s) 110. Moreover, the same or different supplemental content can be provided to those user(s) via the corresponding control devices 130.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, for instance, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Examples of Coordinated Playback of Analog and Digital Media Content

Figure 2:
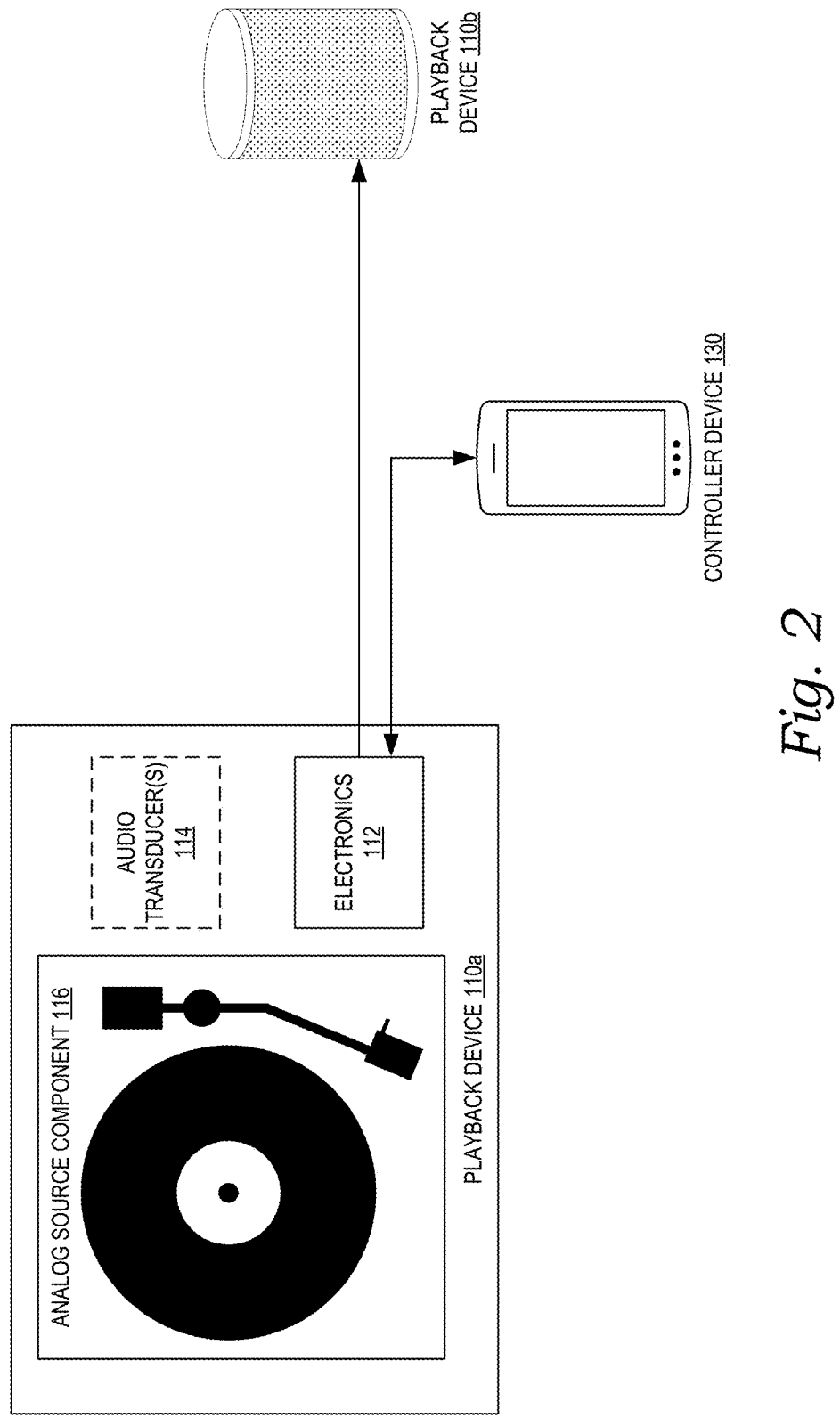
FIGS. 2-8 are schematic diagrams of media playback systems in accordance with examples of the disclosed technology.

FIGS. 2-8 illustrate example media playback systems for control of media playback that involves one or more analog components. As illustrated in FIG. 2, a first playback device 110a can include an analog source component 116 in addition to electronics 112 and, optionally, one or more audio transducers 114. The electronics 112 can include any of the electronics 112 described above with respect to FIG. 1C, such as one or more processors, memory, software components, audio processing components, audio amplifiers, power components, and/or a network interface. In some examples, the electronics 112 are configured to receive audio from the analog source components 116 (e.g., an analog signal obtained during playback of a vinyl LP or other analog media) and process the analog audio according to various configurations. This processing can include, for example, performing an analog-to-digital conversion, analyzing the analog audio signal, amplifying the audio for playback via transducers, etc. The electronics 112 can also include one or more processors configured to perform operations based on instructions stored in memory. These operations can include, for example, transmitting or receiving data via a network interface (e.g., a wired or wireless LAN or WAN connection) to other computing devices or playback devices. In at least some examples, the playback device 110a include one or more microphones (e.g., the playback device 110a can include a network microphone device or be integrated into a network microphone device). In some examples, the electronics 112 can also include one or more microphones and associated components for capturing voice input (or other sound data), and processing voice inputs (or other sound data) to capture user voice commands, environmental noise, or other such inputs.

Although several examples herein refer to an analog source component 116 in the form of a turntable-style record player, any suitable analog source component can be used (e.g., a magnetic tape reader, etc.). Additionally, while several examples illustrate the playback device 110a communicating (e.g., via a network interface) with a second playback device 110b, in some examples the second playback device 110b and the first playback device 110a can be integrated into the same housing or enclosure, thereby forming a single playback device. For example, in each case in which audio content is described as being transmitted from the first playback device 110a to the second playback device 110b, an alternative configuration involves playing back that audio content via the transducer(s) 114 of the first playback device 110a, in which case the second playback device 110b is optional. As also shown, the first playback device 110a and/or the second playback device 110b can be in communication with a controller device 130 (e.g., a smartphone, tablet, laptop, etc.). As used herein, an "analog audio playback device" or "analog playback device" refers to an audio playback device that includes an integrated analog source component 116 (e.g., a turntable-style record player, a cassette tape deck, or other suitable analog media playback mechanism).

With reference to FIG. 2, the playback device 110a can be configured to play back audio based on signals received via the analog source component 116. The audio can be played back via transducer(s) 114 of the playback device 110a or the audio can be transmitted (e.g., over a wired or wireless LAN or WAN connection) to the second playback device 110b for playback. In at least some instances, playback can involve converting the analog audio signals to digital signals for transmission and/or playback of the audio. Additionally or alternatively, the audio can be played back synchronously via the first playback device 110a and the second playback device 110b.

Operation of the first playback device 110a, including operation of the analog source component 116, can be controlled via the controller device 130. For example, a user can provide inputs via the controller device 130 that cause the analog source component to start or stop playback or perform other playback control operations. In the case of a record player, the user's input via the controller device 130 can cause the platter to begin or cease rotation, the tonearm to move into the desired position, or other such physical movement of the analog source component. In the case of a magnetic tape deck, the user's input via the controller device 130 can cause the magnetic tape to move with respect to the tape head (e.g., by movement of an internal pully) or to cease moving. This configuration can enable a user to enjoy audio from analog sources (e.g., vinyl records) while enabling the convenience of a smart media playback system, such as wireless control via a controller device 130 and interaction and coordination with discrete playback devices within the environment.

In some examples, the playback device 110a can control movement of the platter and/or the tonearm in a manner that allows a user to skip portions of audio content (e.g., skip a track), or seek to a given portion of audio (e.g., seek to a selected track), without the user manually manipulating the playback device 110a. For instance, when a given vinyl LP is being played back via playback device 110a, a user may select a "skip" command (e.g., via a controller device 130 or via an input of the first playback device 110a) to skip to the next song on the album. In response to this "skip" command, the playback device 110a can automatically move components of the analog source component to 116 to skip to the selected track. In the case of a turntable, this can involve lifting the tonearm, rotationally moving it to a desired location on the record, and then dropping the tonearm until the stylus or needle lies in contact with the record surface. In the case of a magnetic tape deck, this can involve fast-forwarding to the desired position on the magnetic tape. The desired positions and configurations of the analog source components 116 that correspond to desired tracks can be pre-determined and obtained from a pre-existing database (e.g., for a given album X, tracks 1, 2, and 3 can have predefined physical positions for the tonearm to correspond to these track starting positions). Additionally or alternatively, the desired positions and configurations of the analog source components 116 can be determined by the playback device 110a, such as by optically or physically inspecting grooves of the record to identify track beginnings, or by using any other suitable technique to identify track positions.

In various examples, a playback device 110a incorporating an analog source component 116 and one or more audio transducers 114 can be configured to be placed in more than one orientation. For instance, a turntable-style playback device may be placed in a horizontal orientation (with the record disc rotating in a plane parallel to the ground), or alternatively the turntable-style playback device may be placed in a vertical orientation (with the record disc rotating in a plane perpendicular to the ground). Optionally, the transducers 114 of the playback device 110a can be positioned and configured to provide suitable output in either configuration (e.g., such that the transducers are not blocked or obstructed in either configuration). In some implementations, audio processing can be modified depending on the orientation, for instance by using different arraying techniques to provide audio output signals to the various transducers of the playback device 110a.

One shortfall of analog audio sources can be their relative brevity and the need for repeated user interactions to continue listening to music for extended periods of time. For example, a vinyl LP may be able to encode audio of approximately 25 minutes per side. Once a side is complete, the user has to return to the record player and flip the record over or place a new record on the player. While this ritual can be enjoyable to some, it may be desirable to continue playback of media content after analog playback has ceased (e.g., after playback of one side of a vinyl record has ended). To address these and other problems, in various embodiments a playback device can be configured to dynamically transition between playing back audio based on an analog source component and playing back audio from another source (e.g., digital audio received over a network interface).

Figure 3:
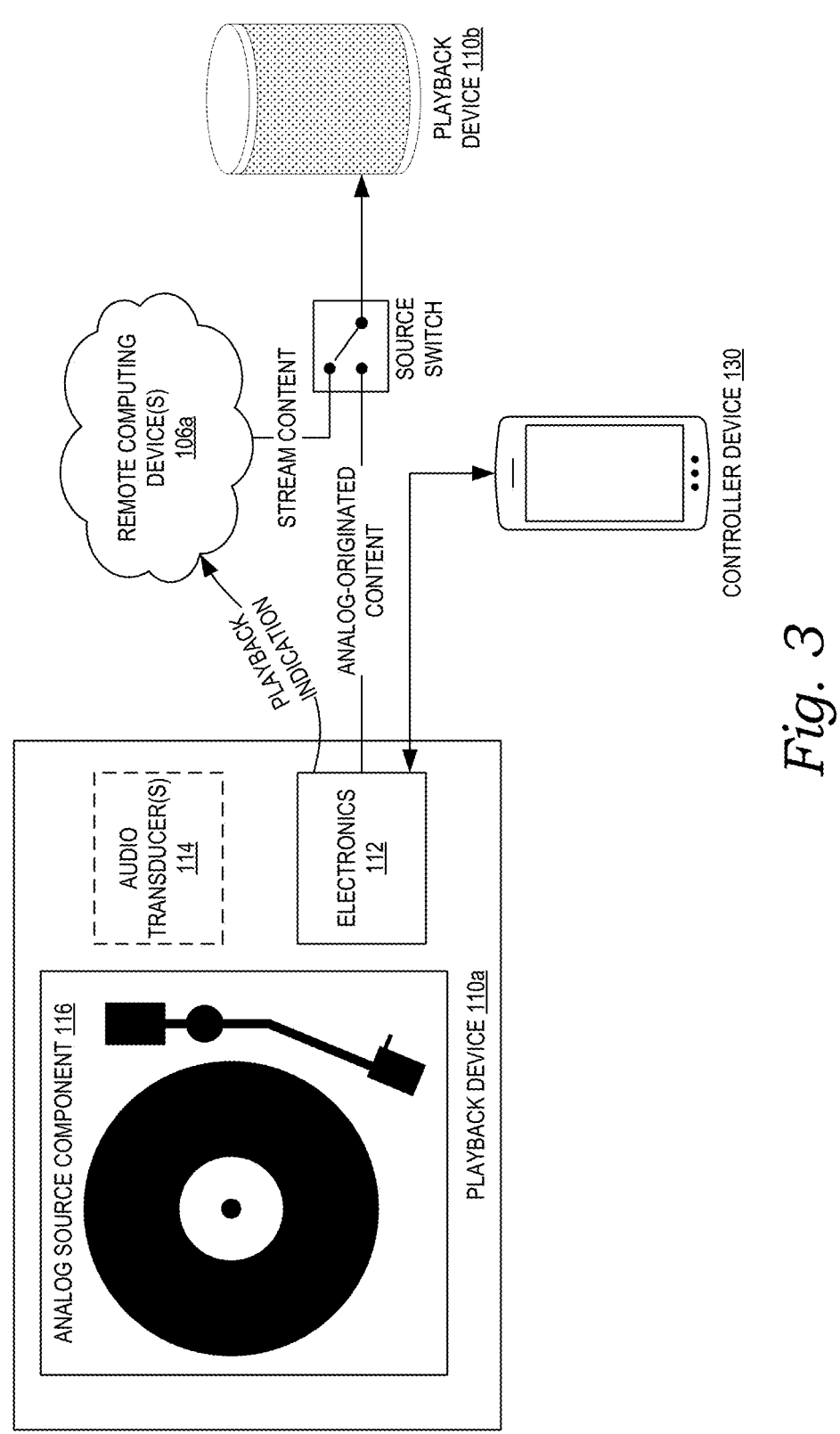

FIG. 3 illustrates an example arrangement that can provide these and other benefits. As shown in FIG. 3, the playback device 110a and/or the playback device 110b can be configured to play back audio from both an analog source component 116 as well as other sources, such as digital audio received over a network interface from one or more remote computing devices 106a. The remote computing devices 106a can include those associated with a media content service or other content source. In the example illustrated in FIG. 3, the second playback device 110b is configured to toggle between playing back analog-originated content received (e.g., over a wired or wireless connection) from the first playback device 110a and playing back content streamed from the remote computing device(s) 106a. This capability is illustrated schematically with a source switch. In various examples, such a switch can be software or hardware-controlled operations occurring within the second playback device 110b, rather than a physical switch external to the second playback device 110b.

In some cases, the first playback device 110a can transmit (e.g., via a network interface) a playback indication to the remote computing device(s) 106a. The playback indication can be an indication that playback of analog source content has ceased (e.g., that a record has reached its end) and/or that analog signals are no longer being generated. This indication can be based on evaluation of the analog signal itself (e.g., obtaining a signal-to-noise ratio or other parameter that can indicate a lack of audio content, where a signal-to-noise ratio below a predetermined threshold can indicate a lack of audio content, identifying a predetermined end-point marker embedded in the analog signal, audio fingerprinting that can identify when a particular piece of content is at its end, etc.). Additionally or alternatively, the indication can include other input parameters, such as a location or orientation of the tonearm or other physical measure of the analog source component, or any other element of the playback device that indicates analog audio signals are no longer being generated or that analog playback has ceased. Based on this indication, the remote computing device(s) 106a can initiate streaming content to the second playback device 110b for playback. For example, once analog playback has ceased (e.g., a vinyl record has reached its end), the first playback device 110a can automatically detect this cessation and cause the remote computing device(s) 106a to stream content for playback to the second playback device 110b. From the perspective of the user's experience, the streaming audio received from the remote computing device(s) 106a can seamlessly follow cessation of the analog-originated audio content.

In some instances, it can be beneficial to identify the content being played back via the analog source component 116. Based on this identification, the system can take other actions, such as providing relevant metadata to the user (e.g., for display via the controller device 130), by streaming related content following cessation of the analog audio content, recommending relevant content to the user, or other such actions.

Figure 4:
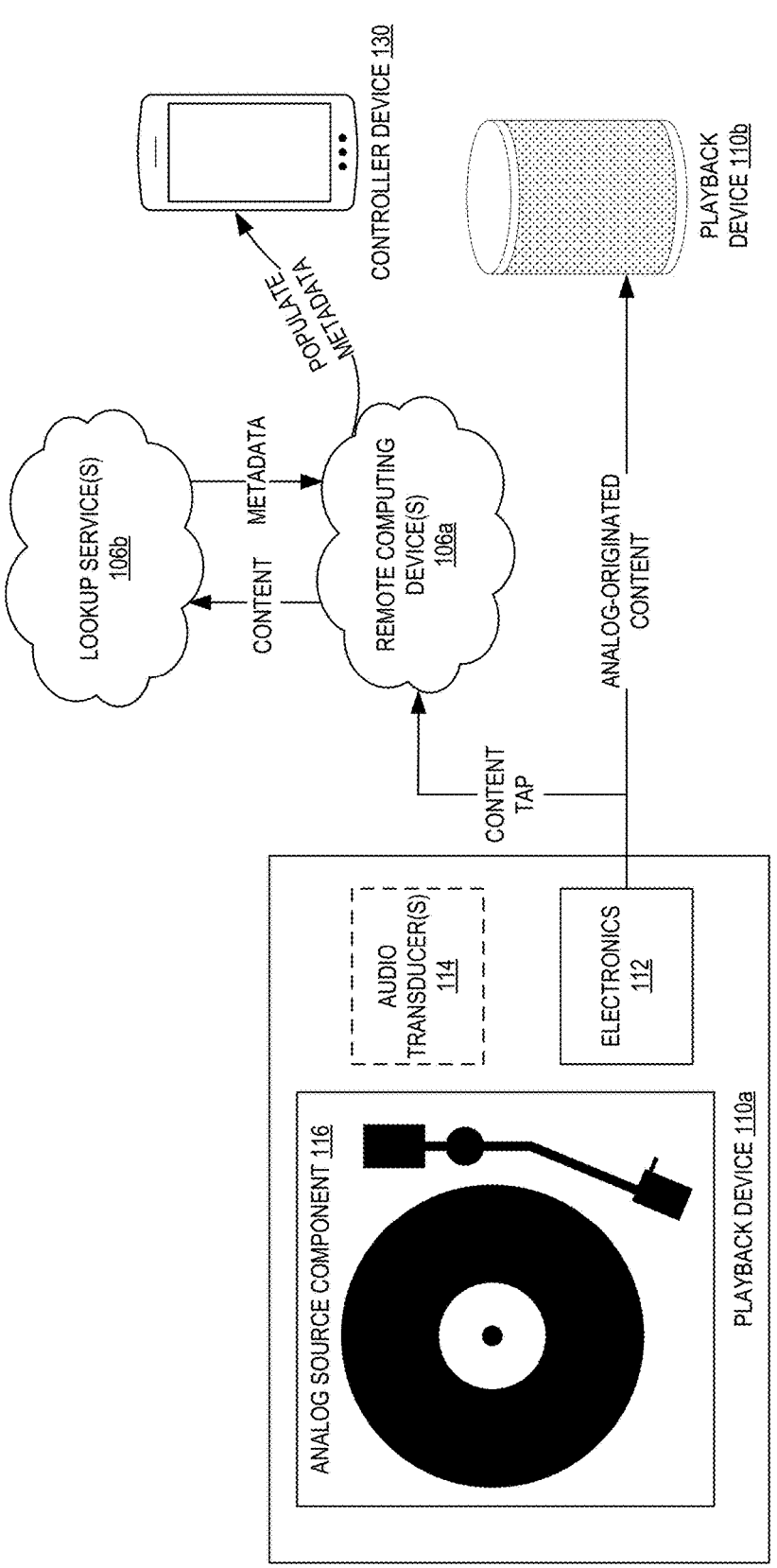

FIG. 4 illustrates an example system in which the analog audio content can be identified using one or more lookup services. As illustrated, analog-originated audio content can be obtained via the analog source component 116 and played back via the second playback device 110b. A content tap of this analog-originated audio content can be transmitted to one or more remote computing device(s) 106a. This content tap can take the form of a copy of the analog-originated audio content, or a parameter extracted from the analog-originated audio content.

The remote computing device(s) 106a can communicate with one or more lookup service(s) 106b to identify the particular content. For example, the content (or a parameter derived from the content) can be transmitted to the lookup service(s) 106b, which can return metadata. The metadata can take the form of an identification of the artist, album, track, associated album art, or any other such data associated with the particular identified content. The lookup service(s) 106b can use any suitable audio fingerprinting techniques or other automatic content recognition approaches known to one of ordinary skill in the art.

In some examples, as shown in FIG. 4, the metadata received from the lookup service(s) 106b can be used to populate metadata to be displayed via the user's controller device 130. For example, the artist, track, album, and/or album art can be displayed to the user via the controller device 130. This can allow the user to easily see the particular track and artist information even when the audio originates from an analog source such as a vinyl record.

In some examples, automatic content recognition can be performed on the analog-originated audio content without using remote cloud-based services. Additionally or alternatively, rather than identifying content based on analyzing the audio itself, the user may use the controller device to scan the album art or to scan an identifier associated with the analog content (e.g., a QR code or RFID embedded in a vinyl LP or cover). In yet another example, the audio may have embedded therein a particular identifier, such as an ultrasonic or near-ultrasonic sound signal that will generally be inaudible to the user but that can be analyzed to identify a particular piece of content.

Figure 5:
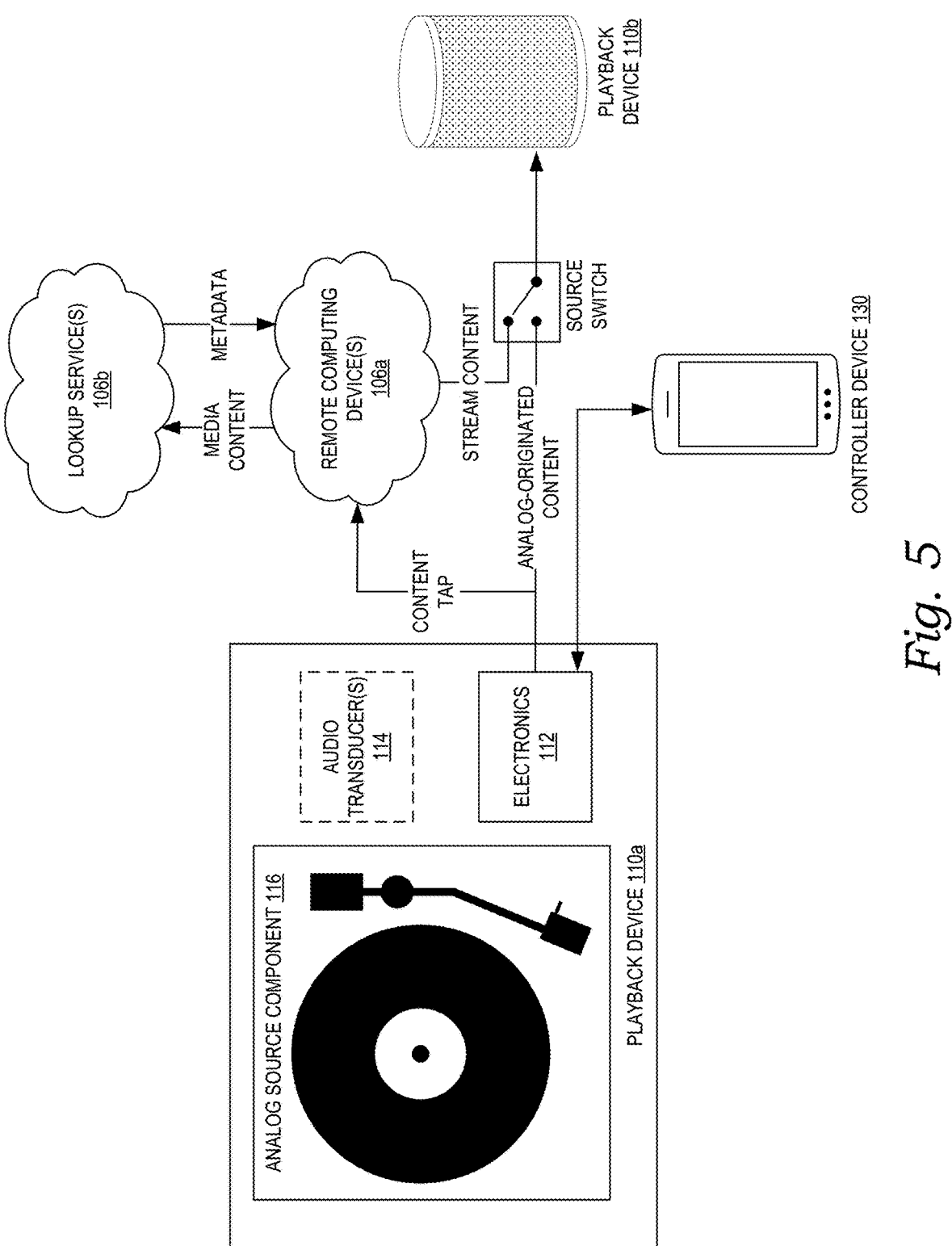

FIG. 5 illustrates another example system for playback of analog and digital media content. As described above with respect to FIG. 3, the second playback device 110b can toggle between playback of analog-originated audio content received via the analog source component 116 and playback of streaming audio content received from the remote computing device(s) 106a. In some examples, the second playback device 110b can initiate playback of the streaming content from the remote computing device(s) 106a following the end of the analog-originated content (e.g., the end of a vinyl LP). The particular content streamed from remote computing device(s) 106a for playback following playback of analog-originated audio content can be informed by the identification of the analog-originated audio content by the lookup service(s) 106b or otherwise. As shown in FIG. 5, the remote computing device(s) 106a can receive a content tap corresponding to the analog-originated audio content and obtain metadata (e.g., artist, track, album identification, etc.)

using one or more lookup service(s) 106*b*. When streaming content is requested (e.g., based on indication that analog playback has ended, as described previously), the remote computing device(s) 106*a* can select content to stream to the second playback device 110*b* based on the metadata obtained from the lookup service(s). For example, once a vinyl record has ended, the streamed content transmitted to the second playback device 110*b* can include additional tracks related to that vinyl record. This can be, for example, tracks from the other side of the vinyl record, other tracks or albums by the same artist, a smart radio station based on that particular artist or album, other content from the same genre, decade, geographical association, etc. The user's experience can therefore be of an "infinite LP," in which selecting and playing a particular, physical vinyl record causes playback both of that vinyl record seamlessly followed by a stream of related audio content.

In some examples, the related audio content can be modified to add characteristics of vinyl to the digital stream, such that the streamed digital content is perceived to be more akin to the analog content that preceded it. The digital content can be modified to add spectral effects like filtering, saturation, low-end rumble, and/or dust/scratch crackle. Modification of the digital content can also be based on analysis of the analog-originated content. For example, the analog-originated audio content can be evaluated for its particular spectral signature and dynamics, and those parameters can be used to inform modification of the digital content so as to smooth over any audible transition from playback of the analog-originated audio content and the subsequent digital content stream. In some cases, such modification may initially seek to match the digital content to the characteristics of the analog-originated audio content (e.g., matching loudness, spectral signature, etc.), with these modifications decreasing gradually over time, optionally fading to a state of no modification. Alternatively, the digital content can be streamed with no such modifications at any time.

While automatically providing a stream of digital content for playback once analog playback has ceased, it can be beneficial to automatically switch back to playback of analog content once the user takes certain actions. For example, when a first side of a vinyl record has ended, the second playback device 110*b* can automatically initiate playback of related content that is streamed from the remote computing device(s) 106*b*. If the user flips over the record, however, the second playback device 110*b* can then automatically switch back to playing the analog-originated audio content. As such, the streamed digital content can serve as "intermission content" to be played back while a user switches from one analog audio source to another. In some examples, such transitions can be crossfaded to avoid a jarring audible contrast, either by default or as a result of a user selection or input.

Figure 6:
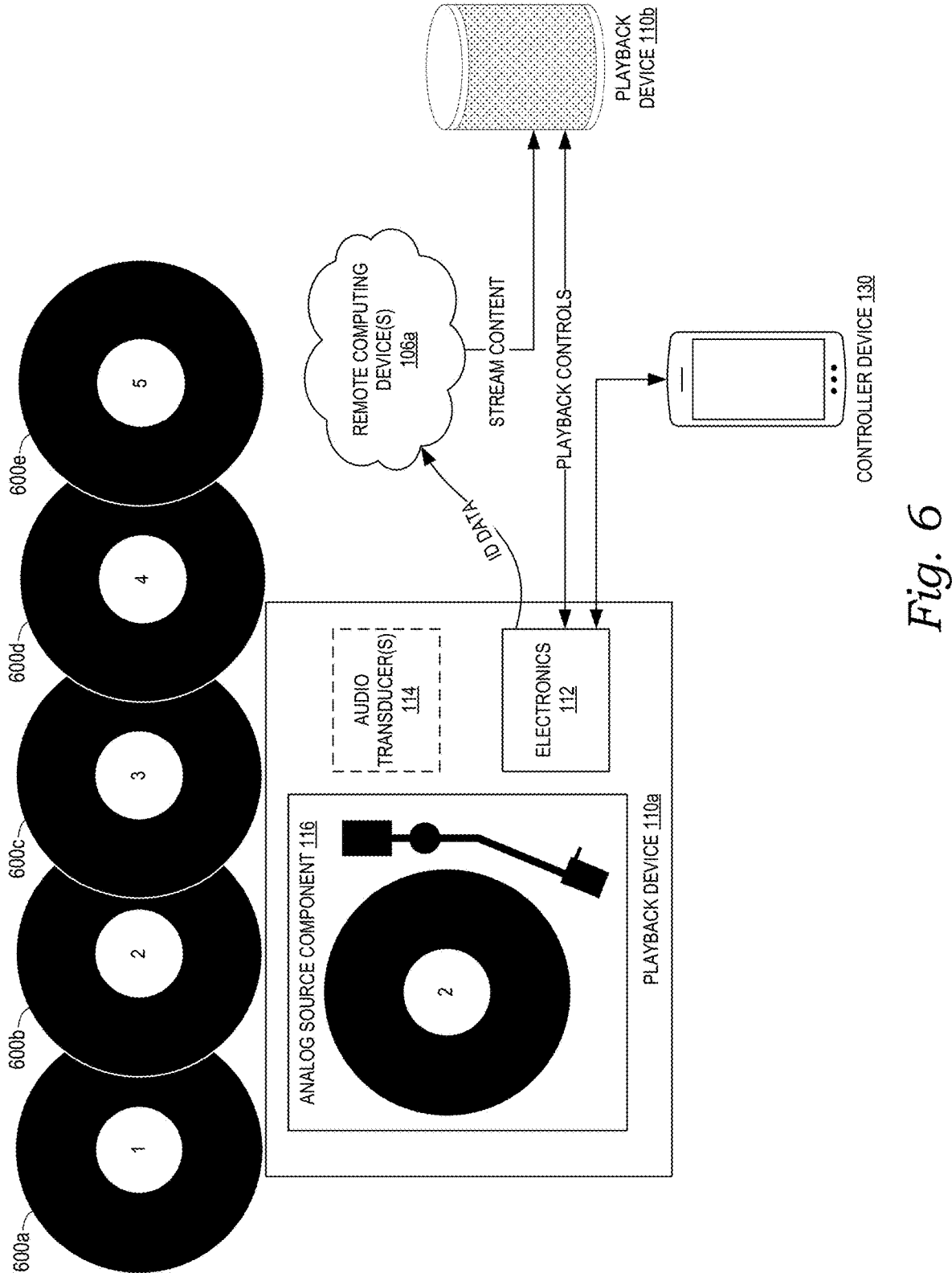
Figure 7:
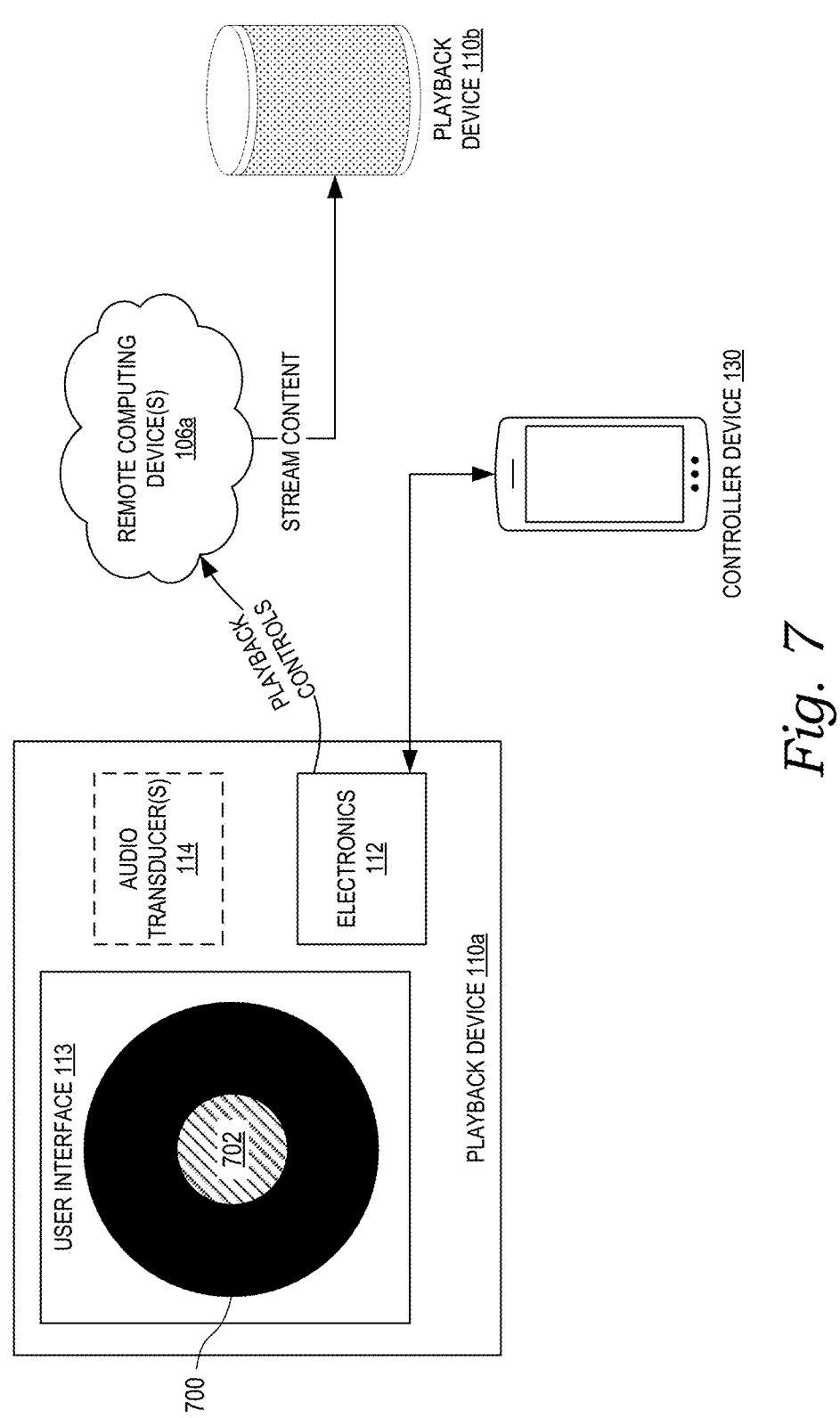

FIG. 6 illustrates another example system for playback of audio using an analog source component 116. However, unlike the systems described above with respect to FIGS. 2-5, the analog source component 116 is configured to extract an identifier from an analog source (e.g., a vinyl record), and this identifier can be used to request and play back corresponding digital content that is stored remotely. In this configuration, various arrangements of media content can be stored digitally while being represented and identified using physical, analog source objects such as vinyl records, tapes, etc.

For example, rather than a vinyl record that has audio encoded in grooves of the record, a vinyl record can have encoded therein an identifier (e.g., a numerical, alphabetic, or alphanumeric code or other such identifier) that can be used to retrieve digital content from remote computing device(s) 106*a*. This can be similar to so-called "digital vinyl" or vinyl emulators, in which two signals are embedded in a vinyl record. A first signal corresponds to a stereo tone in which the channels are out of phase by a known amount. The period of this tone can be translated to playback speed, and the phase to playback direction. A second signal corresponds to a unique timestamp at regular intervals on a given side of the vinyl record. The timestamp can be interpreted as an indicator for needle time position on a side. For a given digital vinyl manufacturer, these two signals are often identical for each digital vinyl record. In contrast, embodiments of the present technology relate to encoding a third signal onto a record, which may be in addition to the first two, and which can be an identifier that is decoded to match a unique container of digital content. In the arrangement shown in FIG. 6, a plurality of different analog content sources (shown here as records 600*a*-600*e*) can be provided, each having a different corresponding identifier embedded therein. When the analog source component 116 engages the particular analog source, the corresponding identifier is extracted. This identifier (shown as "ID data" in FIG. 6) is then transmitted to the remote computing device(s) 106*a*, which can then lookup the particular digital content corresponding to the identifier and stream that content to the second playback device 110*b* for playback. If the user places analog source (e.g., record 600*c*) on the player (analog source component 116), a different identifier can be extracted and used to request playback of different corresponding digital content stored via the remote computing device(s) 106*a*. If the user interacts with the second playback device 110*b* for playback control (e.g., pressing pause, skip, etc.,) those controls can be used to modify playback of the streamed content.

Using physical, analog objects to identify corresponding digital content can provide several advantages while maintaining the aesthetic and experiential aspects of interacting with physical media. For example, a user may create a "vinyl mixtape" by selecting their own desired arrangement of audio tracks. This arrangement can be stored at the remote computing device(s) 106 and associated with a particular identifier that corresponds to a vinyl record carried by the user. Since the vinyl record encodes only a particular identifier, and not the audio itself, the user can dynamically modify the arrangement of digital content corresponding to that identifier. As such, the particular audio played back in response to placing the vinyl record onto a record player can vary over time based on the user's selections. In some embodiments, the identifier can be used to retrieve supplemental content associated with a particular album or other audio content (e.g., extra artist interviews, exclusive tracks, etc.).

As noted previously, some users appreciate the aesthetic and experience of interacting with turntable-style playback devices while still desiring the convenience of smart playback devices that utilize digital audio. In the example shown in FIG. 7, the first playback device 110*a* includes a user interface 113 in the form of a turntable-style rotatable platter, plinth, or disc 700 that optionally includes a display 702 disposed in a central region. In this example, the visual appearance of the user interface mimics that of a record player, albeit without a tonearm or needle. However, in some examples, the user can interact with the interface 113 in a manner similar to those of a record player. For example, the disc 700 can be rotatable such that playback can be initiated by nudging the disc 700 to begin rotating, playback can be paused by touching the disc 700 with enough friction to stop rotation, etc. Additional options include skipping tracks by quickly rotating the disc 700 in a forward direction, or rewinding/repeating by quickly rotating the disc in a backward direction. Such an approach can provide the user with a tactile experience similar to those of a record player, while allowing access to the vastly larger library of available media accessible via the remote computing device(s) 106a. The screen 702 can provide feedback and optionally be touch-enabled to receive user inputs. In some embodiments, such a disc 700 or other turn-table style interface can be integrated into a controller device that is used to control operation of one or more discrete playback devices.

Figure 8:
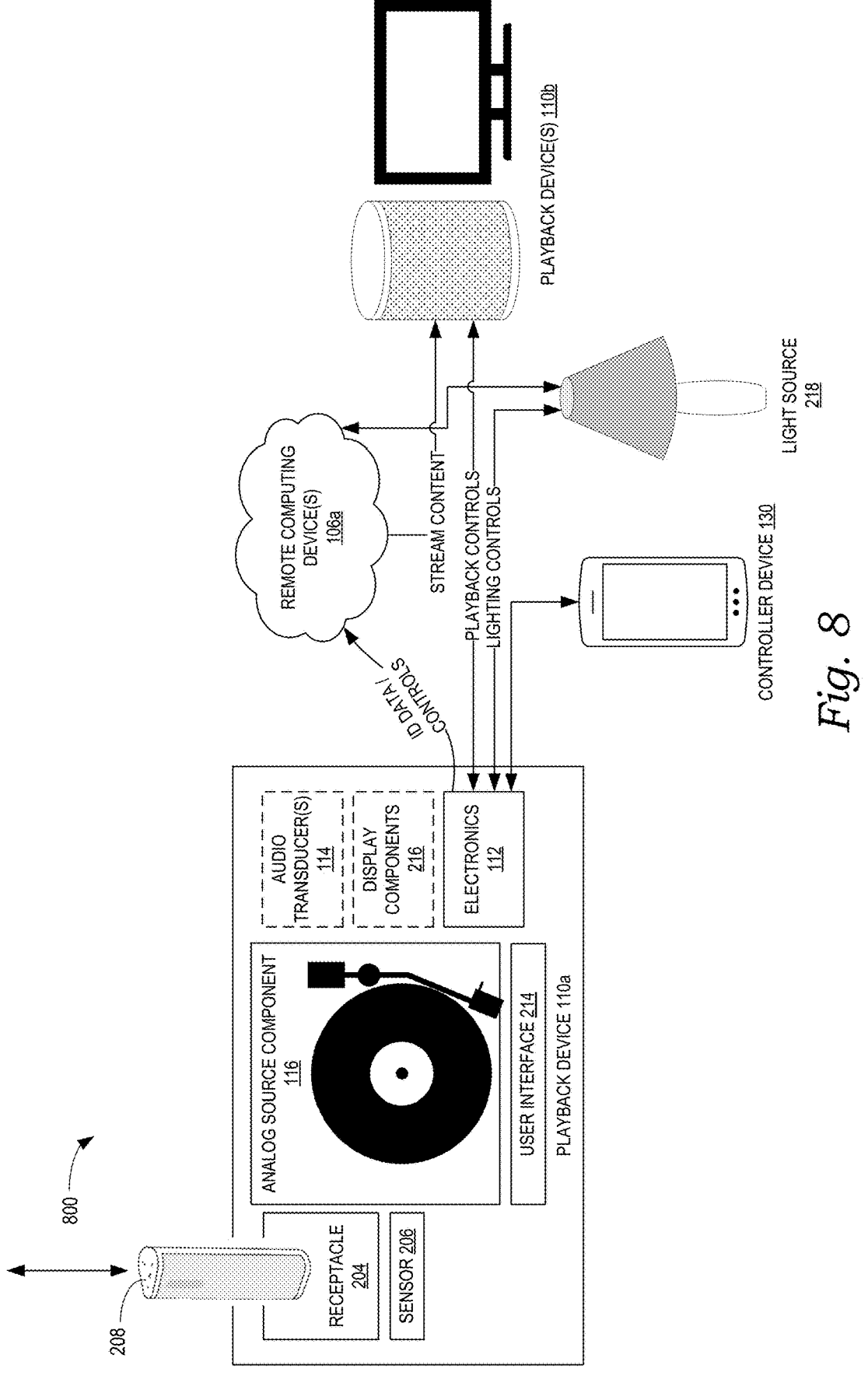

FIG. 8 illustrates another example media playback system 800 for control of media playback that involves an analog source component 116. In the illustrated example, a first playback device 110a can include the analog source component 116 (e.g., a turntable-style record player or other suitable analog audio source component), and can also optionally include one or more audio transducers 114 and associated electronics 112 as described elsewhere herein. As noted previously, a playback device 110 that incorporates an analog source component 116 and is capable of playing back audio based on an analog audio source (e.g., a vinyl LP, cassette tape, etc) can be referred to herein as an "analog playback device" or "analog audio playback device."

In the example shown in FIG. 8, the first playback device 110a is also configured to facilitate playback control involving the use of one or more physical tokens 208, which can take the form of a portable playback device, a handheld object carrying a readable tag therein, or any other suitable physical object. The use of physical tokens 208 for controlling media playback (and/or controlling other functions associated with a media playback system) can provide particular benefits to users. Certain users may prefer the aesthetics and tactile experience associated with handling physical tokens for playback control, as opposed to using a software application or voice input to control playback. Additionally, for vision-impaired users, children who may not be able to operate a control application, or other such users, physical tokens can provide a simplified and streamlined approach to controlling media playback. While the example of FIG. 8 describes a portable playback device 208 serving as the physical token for interoperability with the first playback device 110a, in various implementations the portable playback device 208 may be substituted with another physical token.

As shown in FIG. 8, the media playback system 800 includes a playback device 110a, which can be used to select and control playback of media content (e.g., audio and/or video) via one or more playback device(s). The playback device 110a can play back media based on signals obtained via the analog source component 116 (e.g., playback of analog audio signals directly obtained from the analog source component 116, or the analog input from the analog source component can be digitized for playback). The playback device 110a can also be in communication with one or more remote computing devices 106, which may in turn communicate with one or more playback device(s) 110 within the environment. In various examples, the remote computing devices 106 can include devices associated with media content providers (e.g., SPOTIFY, PANDORA, etc.), voice assistant services (e.g., AMAZON Alexa, GOOGLE Assistant, etc.), lookup servers that can identify particular media content based on identifiers received from the playback device 110a, etc.), and/or any other suitable remote computing devices.

The playback device 110a can receive input in the form of one or more physical tokens 208, each of which carries a corresponding tag (not shown). In the illustrated example, the physical token 208 is a portable playback device. However, in various examples, the physical token 208 can take other forms, such as a non-playback object that carries a QR code, RFID tag, or other suitable tag that can be read by the tag sensor 206 of the playback device 110a. The physical token 208 can be removably engaged with a receptacle 204 of the playback device 110a, and in the engaged position a tag sensor 206 of the playback device 110a is configured to interact with a tag carried by the physical token 208. In some implementations, the receptacle 204 and/or the sensor 206 can be integrated with a wireless charging component configured to wirelessly charge a power storage component of the portable playback device 208. In some instances, detection of initiation of wireless power delivery can function as a tag sensor to detect the presence of the portable playback device 208 in or on the receptacle 204.

In operation, placement of the portable playback device 208 into engagement with the receptacle 204 can one or more actions to be automatically performed by the first playback device 110a or the media playback system 800. For example, coupling the portable playback device 208 to the first playback device 110a can cause audio being played back by the playback device 110a (whether derived from the analog source component 116 or another audio source) to automatically also be played back via the portable playback device 208 in synchrony. In some implementations, audio playback can be "swapped," either automatically upon detection of a trigger condition (e.g., placement of the portable playback device 208 into engagement with the receptacle 204, or within a predefined proximity to the playback device 110a), or in response to user input. When the audio playback is swapped, audio playback via the playback device 110a may cease, and audio playback via the portable playback device 208 may begin seamlessly where audio playback via the first playback device 110a left off.

Optionally, the playback device 110a can include audio transducers 114 and corresponding electronic components to play back audio directly. In some examples, the playback device 110a can take the form of a video playback device, in which case the playback device 110a can include display components 216 configured to output a visible display (e.g., a screen, projector, etc.). The playback device 110a can also optionally include user interface components 214, such as buttons, knobs, switches, touch-sensitive input surfaces, etc.

The electronics 112 can optionally include any of the electronics 112 described above, such as one or more processors, memory, software components, audio processing components, audio amplifiers, power components, and/or a network interface. The electronics 112 can also include power components, such as an energy storage component (e.g., a rechargeable battery), a wireless charging component (e.g., a charging coil configured to receive wireless power from an adjacent charging base, from a nearby playback device, or from any other suitable wireless power transmitter; a charging coil configured to wirelessly charge devices placed thereon (e.g., a user's smartphone, tablet, etc.).

Although several examples illustrate the playback device 110a communicating (e.g., via a network interface) with separate and discrete playback device(s) 110, in some examples, playback device 110 and the playback device 110a can be integrated into the same housing or enclosure, thereby forming a single playback device. For example, in each case in which audio content is described as being played back via the playback device(s) 110, an alternative configuration involves playing back that audio content via the transducer(s) 114 and/or playing back video content via the display components 216 of the playback device 110a, in which case the separate playback device(s) 110 are optional. As also shown, the playback device 110a and/or the playback device(s) 110 can also be in communication with a controller device 130 (e.g., a smartphone, tablet, laptop, etc.), which can provide playback controls, media selection, and other inputs.

In various examples, the receptacle 204 can take any suitable form, which may depend on the particular configuration and form factor of the token(s) 208. For instance, the receptacle 204 can be a designated portion of a surface of the playback device 110a onto which a token 208 can be placed. The receptacle 204 can optionally include an aperture, opening, recess, groove, indentation, or other such feature configured to at least partially receive a physical token 208 therein. In some instances, the receptacle 204 defines an opening with a shape that corresponds to the physical token 208 (e.g., a square-shaped opening configured to receive a cube-shaped token 208).

Optionally, when a user removes the portable playback device or other suitable physical token 208 from the receptacle 204, playback of the corresponding media content can terminate. Alternatively, playback of the media content can continue until actively terminated by a user. In various implementations, one or more passive feedback elements can be incorporated into the portable playback device 208 that can be activated in response to proximity to the playback device 110a (e.g., an RF receiver coil that lights up an LED when the physical token 208 is brought into proximity to the receptacle 204).

In various examples, the tag sensor 206 can be any suitable device, component, or structure that is configured to interact with a tag carried by the physical token 208 to extract an identifier or other data encoded in the tag. Examples of suitable tag sensors 206 include optical sensor(s) (e.g., a camera or other image-capture device, whether still or video) and electromagnetic sensors (e.g., NFC coil, RFID transceiver, inductive coupling sensor, etc.).

With continued reference to FIG. 8, the playback device 110a can also communicate with one or more light sources 218. Such light sources 218 can be "smart" lights that are configured to be controlled via the playback device 110a, for example turning on and off, adjusting brightness levels (brighter, darker), changing color output, outputting a particular light pattern, etc. Additionally or alternatively, the playback device 110a can also communicate with additional playback devices 110b, which may include video playback devices (e.g., televisions, displays, etc.).

FIGS. 9-13 illustrate example methods in accordance with the present technology. The methods described herein can be implemented by any of the devices described herein, or any other devices now known or later developed. Various embodiments of the methods described herein include one or more operations, functions, or actions illustrated by blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the methods described below, and for other processes and methods disclosed herein, the flowcharts show functionality and operation of possible implementations of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random-Access Memory (RAM). The computer readable medium may also include non-transitory media, such as secondary or persistent long-term storage, like read only memory (ROM), optical or magnetic disks, compact disc read only memory (CD-ROM), for example. The computer readable media may also be any other volatile or non-volatile storage systems. The computer readable medium may be considered a computer readable storage medium, for example, or a tangible storage device. In addition, for the methods and for other processes and methods disclosed herein, each block in FIGS. 9-13 may represent circuitry that is wired to perform the specific logical functions in the process.

Figure 9:
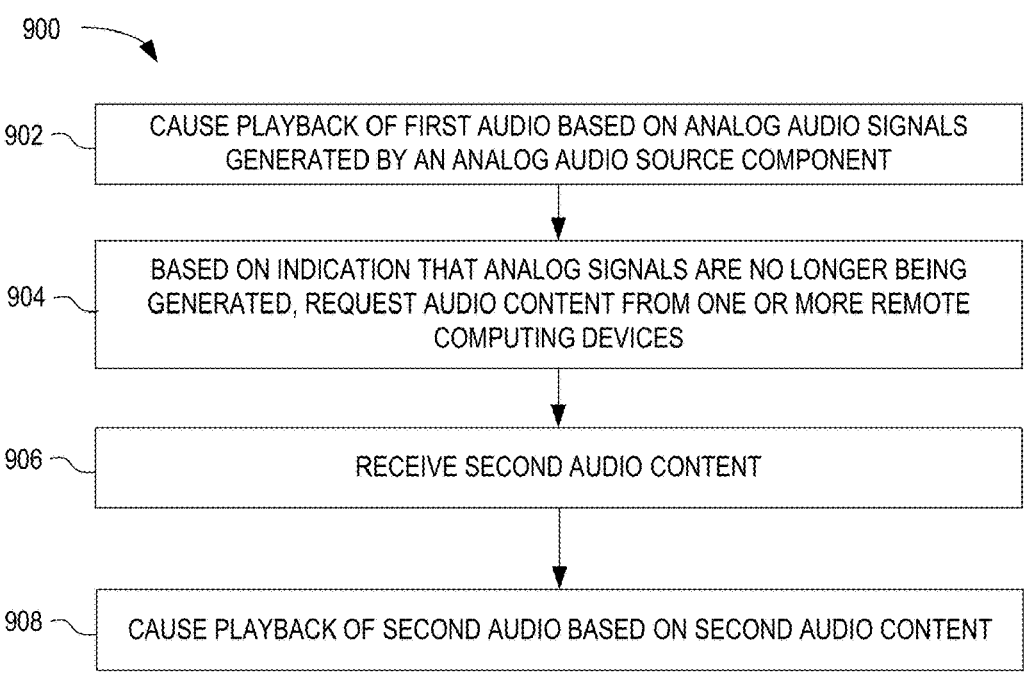

FIG. 9 illustrates an example method for managing playback of analog and digital audio content. The method 900 begins at block 902, which involves causing playback of first audio based on analog audio signals generated by an analog source component. For example, analog audio signals generated by a turntable-style record player can be used to play back audio content. In block 804, based on an indication that analog signals are no longer being generated by the analog audio source component, audio content is requested from one or more remote computing devices. For example, when a record is done playing, streaming audio content can be requested form one or more remote computing devices (e.g., a cloud-based media content service). The indication that analog signals are no longer being generated can be based on evaluation of the analog signal itself (e.g., obtaining a signal-to-noise ratio or other parameter that can indicate a lack of audio content) or other input parameter (e.g., a location of the tonearm, such as evaluation of the angle of the tonearm, or other physical measure of the analog source component or other element of the playback device that indicates analog audio signals are no longer being generated).

In block 906, second audio content is received. For example, if, in block 904, the playback device requests streaming audio content from a media content service, corresponding second audio content can be received via a network interface (e.g., over a local area network, a wide area network, etc.). In block 908, the second audio is played back based on the second audio content. In operation, this method enables a user to seamlessly transition from playing back analog audio content to playing back streaming digital audio content using the same playback device(s).

In various examples, the second audio received from the remote computing device(s) can be based, at least in part, on the particular analog audio content played back previously. For example, the analog audio content can be analyzed to identify the content and retrieve associated metadata (e.g., artist name, track, album, etc.). This metadata can be used to obtain related content for playback via digital streaming, such as other content by the same or related artists, etc. In addition, the analog audio content can be used as a seed or input to a generative media content engine which synthesizes novel media content. For example, analog audio content can be used as a seed or input for any of the generative media content engines described in commonly owned U.S. patent application Ser. No. 17,302,690, filed Mar. 10, 2021, and titled Playback of Generative Media Content, which is hereby incorporated by reference in its entirety.

Figure 10:
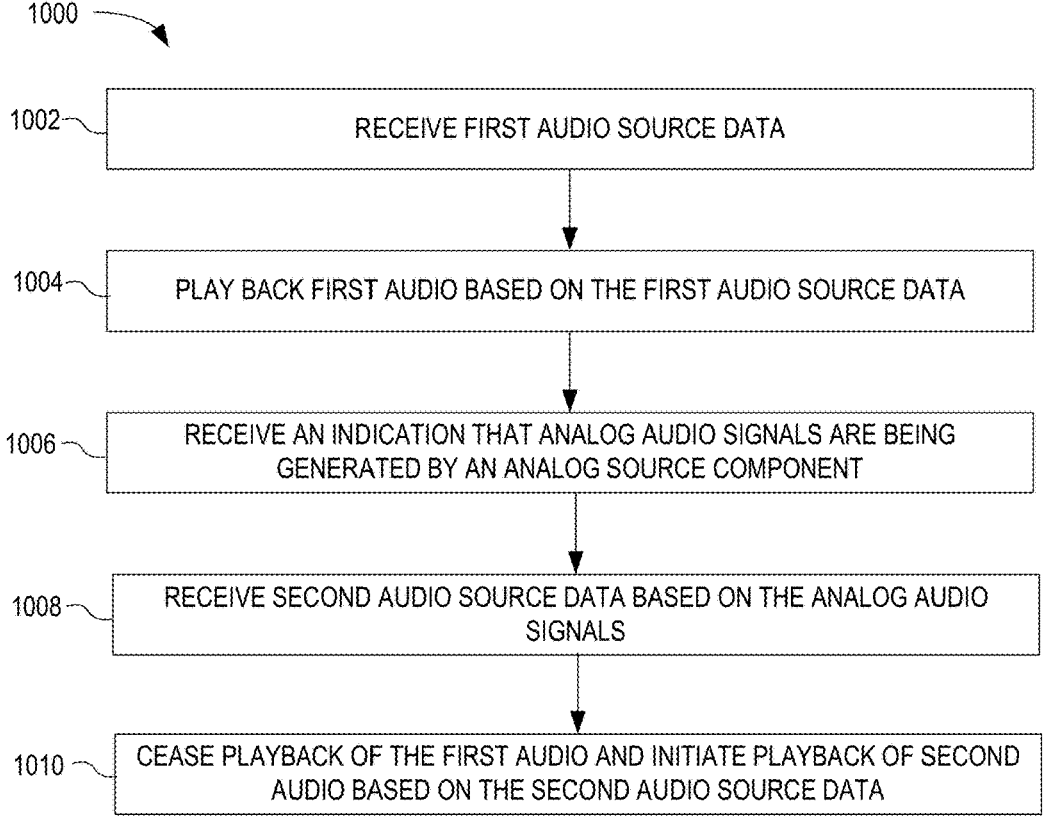

FIG. 10 illustrates another example method for managing playback of analog and digital audio content. With reference to FIG. 10, the method 1000 begins at block 1002, which involves receiving first audio source data and, in block 1004, playing back first audio based on the first audio source data. The first audio source data can take the form of, for example, digital audio content received over a network interface from one or more remote computing devices.

The method 1000 continues in block 1006 with receiving an indication that analog audio signals are being generated by an analog source component and, in block 1008, with receiving second audio source data based on the analog audio signals. This indication can be based on, for example, physical movement of the analog source component (e.g., moving the tonearm, rotation of a platter, etc.). Additionally or alternatively, the indication can be based on analysis of a signal on a line-in from the analog source component (e.g., if the signal-to-noise ratio on the line-in exceeds a predetermined threshold, then the presence of audio signals is indicated).

In block 1010, based on the indication that analog audio signals are being generated, playback of the first audio content (e.g., digital audio streamed from remote computing devices) is ceased, and playback of second audio content based on the second audio source data is initiated. In some examples, this transition can be crossfaded to smooth the change from one audio content to another. As noted above, the second audio source data can take the form of analog signals obtained from a record player or other analog source component. In operation, this method enables a user to seamlessly transition from playing back streamed digital content to playing back analog audio content using the same playback device(s).

FIG. 11 illustrates another example method for managing playback of analog and digital audio content. As illustrated, the method 1100 begins at block 1102, which involves receiving analog audio signals from an analog source component (e.g., a turntable obtaining analog audio signals from a record disc).

In block 1104, the method 1100 includes generating digital audio signals based on the analog audio signals. This can include, for example, locally processing the analog audio signals via the playback device comprising the analog source component (or via another local device) to convert the analog audio signals into a digital format. Additionally or alternatively, the analog audio signals (or metadata associated with the analog audio signals, such as ACR determinations) can be transmitted via a network interface to one or more remote computing devices, which may generate digital audio signals based on the analog audio signals. In still other instances, the digital audio signals may be further extensions, extrapolations, or modifications of the analog audio content, rather than simply being digital content that has been directly converted from the analog audio content. For instance, the digital audio signals can include generative audio signals based on one or more aspects of the analog audio signals, or the digital audio signals can be accompanying media content (e.g., artist narration, ambience or background sounds intended to supplement or augment the analog audio playback, generative audio based on the analog audio signals, etc.).

In block 1106, the method 1100 involves transmitting the digital audio signals for playback via a discrete playback device. In some implementations, the discrete playback device can be pre-selected, for instance by having been previously grouped or bonded with the analog playback device. In some examples, the discrete playback device can be automatically selected based on one or more parameters, such as proximity detection, device type, current playback responsibilities for the discrete playback device, or any other suitable parameter. In the case of proximity detection, the analog playback device can detect a nearest (or near within a predetermined threshold) discrete playback device using, for instance, a particular sensor modality (e.g., acoustic detection, ultrawideband (UWB) localization, Bluetooth or another IEEE 802.15 network, wireless power transfer, NFC tap, etc.), a combination of sensor modalities, and/or manual indication.

In some examples, in addition to or instead of digital audio signals, visual, haptic, aromatic, or other such signals can be transmitted to suitable playback devices in the environment for playback. For example, the analog audio playback device (or other component of the media playback system) can transmit instructions to light sources to modify one or more lighting parameters. In one example, the system can identify an available light source, which may be based at least in part on distance between the light source and the playback device. After identifying and/or selecting one or more light sources, the lighting output can be adjusted based at least in part on the analog audio signals. Using this approach, lighting scene data can be generated or obtained based on the analog audio signals, and optionally lighting can be modified in conjunction with audio playback. This can allow a user to control the visual mood of a space in conjunction with analog audio playback, for instance by controlling lighting parameters to achieve the desired mood (e.g., upbeat dance party, calm study session, etc.). Similar techniques can be applied to visual or video content played back via video display devices (e.g., televisions, display screens, etc.).

In some instances, the analog playback device (i.e., a playback device incorporating the analog source component therein) can play back audio based on the analog audio signals while the discrete playback device can play back audio signals transmitted in block 1106. These two devices can play back their respective audio in synchrony.

The method 1100 proceeds to block 1108 with receiving, from a controller device, an instruction to start or stop the analog source component. For example, if playback of the analog audio signals is ongoing, a user may provide a "pause" command (e.g., via a controller device such as a smartphone). At block 1110, the method 1100 involves mechanically starting or stopping operation of the analog source component. For instance, in the case of a turntable-style analog source component, the rotatable platter can cease rotation and/or the tonearm carrying the needle can be raised to an inactive position in which the needle does not contact the record disc. Optionally, this "pause" command (or other suitable playback command) can also affect playback of the digital audio content via the discrete playback device, for instance pausing playback via both devices in a time-synchronized manner.

FIG. 12 illustrates another example method 1200 for controlling playback of analog audio content. As illustrated, the method 1200 begins in block 1202 with detecting initiation of analog audio playback via an analog source component. For example, in the case of an analog source component that is a turntable-style record player, detection of the initiation of playback may include detecting physical rotation of the platter, engagement of the needle with the record disc, or the angle or other position of the tonearm carrying the needle. In these and other instances, initiation of analog audio playback can be detected.

Following this detection, in block 1204 the method 1200 involves transmitting, via a network interface, instructions to cause a playback device to perform a command. The recipient playback device can be another playback device within the environment (e.g., communicatively coupled over a LAN), and the instructions can include playback commands. In some instances, the playback instructions can include instructions to form a synchrony group (e.g., grouping or bonding the recipient playback device with the analog playback device for synchronous playback).

In some implementations, the command can include instructions to begin playback of certain audio content. The audio content can be synchronized audio that corresponds directly to the analog audio content (e.g., both the analog audio content and the audio content played back via the recipient playback device are the same audio track, even if in different formats). In certain examples, the audio content can be supplemental or auxiliary audio content, which may be related to but distinct from the analog audio content. For example, the supplemental or auxiliary audio content may be artist commentary or narration, ambient or environmental sounds, generative audio that uses components of the analog audio content as a seed or other input, etc.

In some examples, supplemental or auxiliary content can be played back in a manner that is device-dependent. For instance, when multiple playback devices are grouped for audio playback (including an analog audio playback device), audio output can be played back via larger, relatively more distant devices from the analog audio playback device, while supplemental or auxiliary content (e.g., artist narration) may be played back via devices closer to the analog audio playback device. In this manner, a user (who may be positioned near to the analog audio playback device) can hear the supplemental or auxiliary audio content without detracting from playback of the audio content from the more capable audio playback devices. Optionally, playback of the supplemental or auxiliary content may be restricted to certain device types, brands, or characteristics, or may be restricted to certain users (e.g, subscribers to certain services).

In various examples, the recipient playback device can be or include a visual playback device (e.g., a video display device, a "smart" lighting source, etc.). In such instances, the command performed by such devices can include initiation, cessation, or modification of visual output. The visual output can include room lighting (e.g., modifying color, brightness, illumination patterns, etc.), or display content (e.g., abstract visual patterns or other video content to be displayed concurrently with the analog audio playback).

FIG. 13 illustrates another example method 1300 for controlling playback of analog audio content. As illustrated, the method 1300 begins in block 1302 with detecting that a portable playback device has been removably coupled to an analog audio playback device. For example, as shown in FIG. 8, an analog playback device can include a receptacle configured to removably receive a portable playback device thereon. The receptacle can take the form of a wireless charging pad, an indentation, groove, or other feature configured to receive the portable playback device thereon. Additionally or alternatively, the portable playback device can be coupled to the analog audio playback device by being placed in sufficient proximity (e.g., within 3 feet, within 1 foot, within 6 inches, etc.) of the analog playback device. In still other implementations, the portable playback device can be coupled to the analog audio playback device by establishing a wireless connection (e.g., a Bluetooth connection).

In block 1304, responsive to detecting that the portable playback device has been coupled to the analog audio playback device, the method 1300 involves automatically modifying playback of audio content via at least one of: the analog audio playback device, the portable playback device, or a second discrete playback device. For example, modifying playback can include automatically grouping the portable playback device with the analog audio playback device for synchronous playback such that analog audio content is played back via the analog audio playback device while corresponding (or, optionally, supplemental) audio content is played back via the portable playback device.

In another example, modifying playback can include "swapping" audio playback from the analog audio playback device to the portable playback device. In this scenario, playback via the analog audio playback device can be paused or ceased, and corresponding audio playback can be automatically initiated via the portable playback device. This handoff can be time-synchronized so that playback is substantially uninterrupted, and playback merely shifts from the analog playback device to the portable playback device. Next, if a user moves the portable playback device, the audio content can continue playing back via the portable playback device. As described in more detail above, this content played back via the portable playback device may be digital content received from one or more remote computing devices, and may be based on the analog audio signals. As such, while the user perception may be that the portable playback device and the analog audio playback device each play back the identical content, in practice the analog audio playback device may obtain audio signals from the analog source (e.g., vinyl LP) while the portable playback device may obtain digital audio signals for the same item of content (e.g., same track from the same album) from one or more remote computing devices. In another example, as also described previously, the analog audio playback device can generate digital audio signals and transmit these to the portable playback device for playback, thus potentially eliminating the need for remote computing devices to intervene.

IV. Examples of Playback Based on Provider Intent

Figure 14:
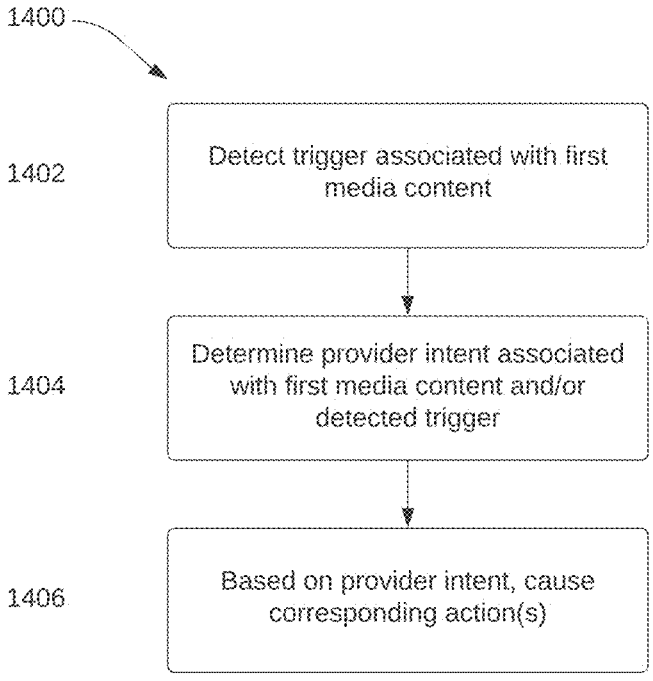

FIG. 14 illustrates an example method 1400 of causing media playback based on provider intent. The method 1400 begins at block 1402 in which a trigger condition is detected based on playback of one or more media items. Based on the detected trigger condition, instructions based on provider intent can be determined (block 1404) and playback of second media content (and/or one or more other actions) can be performed accordingly (block 1406).

In some examples, a playback device comprising a turntable (e.g., the analog source component 116 of FIGS. 2-6) plays back audio from an LP (either via one or more other devices or perhaps the playback device itself). After the stylus of the turntable reaches the end of one side the method 1400 at block 1402 can detect this condition, which can serve as a trigger. In some examples, the method 1400 comprises analyzing the audio input via the needle and determining that the audio signal(s) correspond to a stylus traveling through a lock groove at the end (i.e., proximate the center) of the LP. In some examples, the method 1400 at block 1402 comprises determining that the playback device has automatically disengaged from the LP. In certain examples, the method comprises receiving sensor data from one or more sensors (e.g., a sensor of the other components 112*j* of FIG. 1C) indicating that the stylus has reached (or is close to reaching) the end of the LP. The one or more sensors can comprise a suitable sensor for determining the position of the stylus, such as a visual sensor (e.g., a camera), a laser sensor, etc. In some examples, at block 1420, the method 1400 includes simply detecting the cessation of playback as described above, for example, with respect to FIG. 3.

In the examples described above, the one or more media items comprise vinyl LPs. In other examples, the one or more media items can include other analog media (e.g., cassette tapes), digital media (e.g., minidisc, compact discs, DVDs, Blu-ray discs, video games, NFC tags embedded in one or more objects), streaming media (e.g., streaming audio, streaming video), other suitable media sources, etc. In some examples, the one or more media items can comprise a live media input, such as audio from one or more microphones, video from one or more cameras, etc. In some examples, the one or more media items comprise one or more novel media items, soundscapes, videoscapes, mediascapes, etc. that are generated via one or more algorithms, models, and/or artificial intelligence (AI) engines, platforms, chat interfaces, etc.

Referring again to block 1402, the examples discussed above the trigger condition(s) comprise a detection of an end of media playback of a particular set of one or more media items. In some examples, the trigger condition can comprise another point within playback of one of the one or more media items. For instance, a trigger condition can include a specific time (or times) within a particular song, album, audiobook, podcast, video, playlist, etc. Other trigger conditions can include detecting that playback has started, been paused, skipped, resumed, etc. In some examples, a trigger condition can comprise manual input and/or a voice command. In certain examples, a trigger condition comprises a predetermined event (e.g., an alarm) scheduled to run on a target playback device involved in the playback of the one or more media items, and/or perhaps one or more devices on the media playback system.

In some examples, when the one or more media items comprise playback of an analog media source, detecting a trigger condition can comprise detecting various stylus positions and/or connection/disconnection states. In some cases, for instance, a trigger condition can comprise determining that the stylus is at a predetermined position on an LP, such as a particular time stamp or track. In some cases, detecting a trigger condition comprises detecting that the stylus has engaged (i.e., been placed on) or disengaged (i.e., lifted off) an LP.

In some examples, the playback device playing back media content, or, in the case of an analog or digital media device, reading or accessing stored media data, will itself detect a particular trigger condition. The playback device in these scenarios can take action accordingly and/or communicate details of a trigger condition to one or more other playback devices. In one example, for instance, an LP turntable generates, via a stylus, analog audio signals from an LP, converts the signals to audio data, and transmits the converted audio data to another playback device for audio output. Consider the case of an LP turntable sending audio wirelessly to another nearby playback device, such as a portable playback device via a network interface. The LP turntable may also send, via a network interface (e.g., a wifi and/or Bluetooth interface), data corresponding to the detected trigger condition. In some examples, the playback device receiving the audio from the LP turntable may also be involved with or independently detect the same trigger condition (or a different trigger condition).

Referring now to block 1404, the method 1400 comprises determining a provider intent based on the trigger condition. As described above, a provider can comprise one or more artists, musicians, performers, actors/actresses, producers, directors, recording engineers, etc. After a trigger condition (or perhaps more than trigger condition) has been detected and/or identified, a corresponding action (or set of actions) can be performed or caused to be performed via one or more devices.

In some examples, instructions associated with the provider intent can be stored on and/or embedded in the media content itself. Consider the case of an analog storage medium such as a vinyl LP, cassette tape (e.g., a magnetic tape compact cassette, laserdisc), or another suitable format. In some instances, the instructions may be embedded in the medium itself (or perhaps encoded within the media content), in a suitable form that can be readily accessed by a playback device. In some examples, rather than complete instructions being embedded on the medium or encoded within the media content, an identifier (e.g., a URI and/or URL) is embedded/encoded that indicates to the playback device one or more locations where the provider intent can be accessed. Use of an identifier can provide flexibility by allowing a provider intent that is manually or automatically adjustable based on, for instance, contextual information, revised provider intent, time of day/year, etc. As those of ordinary skill in the art will appreciate, the examples described above can be implemented with a digital storage medium/media rather than (or in addition to) an analog storage medium.

In some examples, instructions associated with the provider intent can be stored in and/or on one or more particular locations on a media playback system, media content source, and/or another suitable storage location. In some instances, a playback device playing back audio (or perhaps another device in the same media playback system) identifies a particular media item being played back. Based on the identified media content and/or a detection of a trigger condition (or more than one trigger conditions), the associated provider intent can be determined. In some instances, for example, the provider intent is stored as a lookup table or similar data structure.

Referring again to block 1406, the method 1400 causes a corresponding action (or set of actions) based on the determined provider intent. In some examples, the corresponding action comprises causing a transition of source input from a first source (e.g., analog source) to a second source (e.g., digital hardware interface, digital streaming interface, a second analog source). For instance, a provider of a particular media item (e.g., song, album, podcast, audiobook, video program, movie) may prefer that a listening session transition to a different source based on a trigger condition, such as the end of a particular media item.

In one set of scenarios, a playback device detects that an end of a vinyl LP has been reached and determines, based on the associated provider intent, that playback should automatically transition to playback via a particular streaming service and playback a selected media item (or set of media items). In some examples the media items may include content related to the vinyl LP from the same artist(s) or perhaps a different artist or artists. In some examples, the selected media items(s) may comprise content that is exclusive to listeners that playback the vinyl LP.

In another set of scenarios, the listener (or viewer) is consuming first media content via a first playback device (e.g., a television). Based on a detected trigger condition (e.g., the end of the content), playback of second media content can be initiated on a second playback device based on provider intent associated with the first media content. In some examples, the first playback device ends playback when playback is initiated on the second playback device. In some examples, the first playback device is grouped with the second playback device in a synchrony group that plays back the second media content.

In some examples, playback of first media content on a first playback devices is paused due to a detection of a trigger condition (e.g., an amount of elapsed time during playback of the first media item, a predetermined timestamp during playback, another suitable event) and playback of second media content is initiated on a second playback device (that may or may not be grouped with the first playback device) in accordance with provider intent associated with the first media item. When playback of the second media content via the second playback device ends, playback of the first media item can resume. In some examples, the second media content may comprise media that is related to the first media content. In some instances, for example, the second media content may comprise an audio track, a video track, etc. that serves as a commentary or other complementary media to the first media content. In one example, the trigger condition comprises a timestamp associated with a particular temporal position, scene, frame, audio content, etc. and the corresponding provider intent may comprise an audio track from the provider describing something related to the first media content at the particular timestamp. In some examples, the second media content may comprise an advertisement related to the provider or simply inserted at the particular time during playback of the first media content. When the second media content is finished, the first media content resumes.

In some examples, the provider intent may comprise second media content whose playback is intended to overlap the first media content. For instance, a trigger condition may comprise a timestamp associated with a particular temporal position in the first media content. In response to the trigger condition, playback of second media content can be initiated via a second playback device in synchrony with playback of the first media content via the first playback device. Applicant's co-owned U.S. application Ser. No. 14/617,604, titled "Synchronized Audio Mixing," filed on Feb. 9, 2015, and issued on May 30, 2017, as U.S. Pat. No. 9,665,341 (which is hereby incorporated by reference in its entirety for all purposes), describes, among other features, mixing multiple audio streams (or media content) and playing the mixed streams. In some examples, a first and second playback device play back corresponding first and second audio content while third audio content is mixed in such that the individual devices play back the third audio content in synchrony while continuing to play back their respective first and second audio content.

In some examples, the second media content comprises content related to the first media content such as a commentary audio track as described above. In certain examples, the second media content may be exclusive on a user basis. For instance, in some examples, the second media content may only be available to a) all or particular subscribers of a particular media content provider, b) members of a fan club, and/or c) users who recently attended an event (e.g., a concert, movie, or another event) that included or involved the provider, etc.

In some examples, the trigger conditions and/or provider intent differ based on contextual information. In some scenarios, the provider intent may include, in response to a trigger, at least one of: performing a first action based on first context data, performing a second action based on second context data, performing a third action based on third context data, and so on. For instance, the provider intent may include transitioning to a corresponding input (or perhaps selecting media content from the same input) based on time of day, such as morning (e.g., first context data), afternoon (e.g., second context data), or evening (e.g., third context data). For each context data, a different action (e.g., transition between media content or inputs) may be performed. In some examples, one action may be performed for a particular trigger condition based on a particular context. In other examples, each action may be performed, in response to a detected trigger condition, as a particular context data is detected.

In the examples described above, the context data comprises a time of day; in other examples, the context data may be another time period (e.g., day(s) of the week, week of the month, month of the year, season, lunar phase, and so on). In some examples, one or more of the context data comprises sensor data received via the media playback system, such via the one or more components 112*j* (FIG. 1C), the one or more microphones 115 (FIG. 1F), the tag sensor 206 (FIG. 8), and/or one or more other suitable sensors (e.g., humidity sensor, temperature sensor, weather station sensor(s), ambient light sensor). In some examples, based on microphone data indicating little or no speech versus speech of multiple people (which could be indicative of a quiet environment versus a party), the provider intent may differ. For instance, in the former case, the provider intent may be for ambient, focused media content, while in the latter case, the provider intent may be for louder content typically associated with a party or similar large gathering. In another scenario, based on a determination of the weather (via, for instance, weather station data or data received via a network from an internet weather service or website), the provider intent may differ. Accordingly, action corresponding to particular provider intent may vary, for example, based on whether the weather in a user's location (or a specified location remote from the user) is sunny weather, rainy weather, winter weather, thunderstorms, etc.

V. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example embodiment or implementation of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. A first playback device comprising: an analog audio source component; one or more audio transducers; a network interface; one or more processors; and data storage having instructions therein that, when executed by the one or more processors, cause the first playback device to perform operations comprising: generating first audio signals via the analog audio source component; playing back, via the one or more audio transducers, audio based on the first audio signals generated via the analog audio source component; and transmitting, via the network interface, second audio signals based on the first audio signals generated via the analog audio source component, to a second playback device for synchronous playback.

Example 2. The first playback device of any one of the preceding Examples, wherein the operations further comprise, before transmitting the second audio signals to the second playback device: detecting initiation of the analog audio source component; and responsive to detecting initiation of the analog audio source component, forming a synchrony group including the first playback device and the second playback device.

Example 3. The first playback device of any one of the preceding Examples, wherein the first playback device is a turntable-style playback device, and wherein the analog audio source component comprises: a rotatable platter configured to receive a record disc thereon; and a tonearm configured to carry a needle, the tonearm moveable between an active position in which a needle carried thereby contacts a record disc received on the platter and an inactive position in which a needle carried thereby is spaced apart from the record disc received on the platter.

Example 4. The first playback device of any one of the preceding Examples, wherein the operations further comprise, before transmitting the second audio signals to the second playback device: detecting contact between the needle and the record disc; and responsive to detecting contact between the needle and the record disc, forming a synchrony group including at least the first playback device and the second playback device.

Example 5. The first playback device of any one of the preceding Examples, wherein the operations further comprise, concurrently with playing back, via the one or more audio transducers, audio based on the first audio signals generated via the analog audio source component, causing one or more visual playback devices to modify a visual output.

Example 6. The first playback device of any one of the preceding Examples, wherein the second audio signals comprise digital audio signals corresponding to the first audio signals generated via the analog source audio component.

Example 7. The first playback device of any one of the preceding Examples, wherein the second audio signals comprise supplemental audio content based at least in part on the first audio signals generated via the analog source audio component.

Example 8. The first playback device of any one of the preceding Examples, further comprising a receptacle configured to removably coupled to a portable playback device, wherein the operations further comprise: detecting that a portable playback device has been removably coupled to the receptacle; and after the detection, automatically modifying playback of audio content via at least one of the first playback device, the second playback device, or the portable playback device.

Example 9. The first playback device of any one of the preceding Examples, wherein modifying playback of audio content comprises grouping the portable playback device with the first playback device for synchronous playback.

Example 10. The first playback device of any one of the preceding Examples, wherein modifying playback of audio content comprises ceasing playback of audio content via the one or more audio transducers and initiating playback of corresponding audio content via the portable playback device.

Example 11. The first playback device of any one of the preceding Examples, wherein the receptacle comprises a wireless charging component configured to wirelessly charge an energy storage component of the portable playback device.

Example 12. The first playback device of any one of the preceding Examples, wherein the operations further comprise obtaining an automatic content recognition (ACR) determination based on the first audio signals.

Example 13. The first playback device of any one of the preceding Examples, wherein the operations further comprise obtaining metadata based on the ACR determination.

Example 14. The first playback device of any one of the preceding Examples, wherein the operations further comprise causing the metadata to be displayed via a controller device.

Example 15. The first playback device of any one of the preceding Examples, wherein the obtaining the ACR determination comprises receiving the ACR determination from one or more remote computing devices.

Example 16. A method comprising: generating first audio signals via an analog audio source component of a first playback device; playing back, via one or more audio transducers of the first playback device, audio based on the first audio signals generated via the analog audio source component; and transmitting, via a network interface of the first playback device, second audio signals based on the first audio signals generated via the analog audio source component, to a second playback device for synchronous playback.

Example 17. The method of any one of the preceding Examples, further comprising, before transmitting the second audio signals to the second playback device: detecting initiation of the analog audio source component; and responsive to detecting initiation of the analog audio source component, forming a synchrony group including the first playback device and the second playback device.

Example 18. The method of any one of the preceding Examples, wherein the first playback device is a turntable-style playback device, and wherein the analog audio source component comprises: a rotatable platter configured to receive a record disc thereon; and a tonearm configured to carry a needle, the tonearm moveable between an active position in which a needle carried thereby contacts a record disc received on the platter and an inactive position in which a needle carried thereby is spaced apart from the record disc received on the platter.

Example 19. The method of any one of the preceding Examples, further comprising, before transmitting the second audio signals to the second playback device: detecting contact between the needle and the record disc; and responsive to detecting contact between the needle and the record disc, forming a synchrony group including at least the first playback device and the second playback device.

Example 20. The method of any one of the preceding Examples, further comprising, concurrently with playing back, via the one or more audio transducers, audio based on the first audio signals generated via the analog audio source component, causing one or more visual playback devices to modify a visual output.

Example 21. The method of any one of the preceding Examples, wherein the second audio signals comprise digital audio signals corresponding to the first audio signals generated via the analog source audio component.

Example 22. The method of any one of the preceding Examples, wherein the second audio signals comprise supplemental audio content based at least in part on the first audio signals generated via the analog source audio component.

Example 23. The method of any one of the preceding Examples, wherein the first playback device further comprises a receptacle configured to removably coupled to a portable playback device, the method further comprising: detecting that a portable playback device has been removably coupled to the receptacle; and after the detection, automatically modifying playback of audio content via at least one of the first playback device, the second playback device, or the portable playback device.

Example 24. The method of any one of the preceding Examples, wherein modifying playback of audio content comprises grouping the portable playback device with the first playback device for synchronous playback.

Example 25. The method of any one of the preceding Examples, wherein modifying playback of audio content comprises ceasing playback of audio content via the one or more audio transducers and initiating playback of corresponding audio content via the portable playback device.

Example 26. The method of any one of the preceding Examples, wherein the receptacle comprises a wireless charging component configured to wirelessly charge an energy storage component of the portable playback device.

Example 27. The method of any one of the preceding Examples, further comprising obtaining an automatic content recognition (ACR) determination based on the first audio signals.

Example 28. The method of any one of the preceding Examples, further comprising obtaining metadata based on the ACR determination.

Example 29. The method of any one of the preceding Examples, further comprising causing the metadata to be displayed via a controller device.

Example 30. The method of any one of the preceding Examples, wherein the obtaining the ACR determination comprises receiving the ACR determination from one or more remote computing devices.

Example 31. A tangible, non-transitory, computer-readable medium storing instructions that, when executed by one or more processors of a first playback device, cause the first playback device to perform operations comprising: generating first audio signals via an analog audio source component of the first playback device; playing back, via one or more audio transducers of the first playback device, audio based on the first audio signals generated via the analog audio source component; and transmitting, via a network interface of the first playback device, second audio signals based on the first audio signals generated via the analog audio source component, to a second playback device for synchronous playback.

Example 32. The computer-readable medium of any one of the preceding Examples, wherein the operations further comprise, before transmitting the second audio signals to the second playback device: detecting initiation of the analog audio source component; and responsive to detecting initiation of the analog audio source component, forming a synchrony group including the first playback device and the second playback device.

Example 33. The computer-readable medium of any one of the preceding Examples, wherein the first playback device is a turntable-style playback device, and wherein the analog audio source component comprises: a rotatable platter configured to receive a record disc thereon; and a tonearm configured to carry a needle, the tonearm moveable between an active position in which a needle carried thereby contacts a record disc received on the platter and an inactive position in which a needle carried thereby is spaced apart from the record disc received on the platter.

Example 34. The computer-readable medium of any one of the preceding Examples, wherein the operations further comprise, before transmitting the second audio signals to the second playback device: detecting contact between the needle and the record disc; and responsive to detecting contact between the needle and the record disc, forming a synchrony group including at least the first playback device and the second playback device.

Example 35. The computer-readable medium of any one of the preceding Examples, wherein the operations further comprise, concurrently with playing back, via the one or more audio transducers, audio based on the first audio signals generated via the analog audio source component, causing one or more visual playback devices to modify a visual output.

Example 36. The computer-readable medium of any one of the preceding Examples, wherein the second audio signals comprise digital audio signals corresponding to the first audio signals generated via the analog source audio component.

Example 37. The computer-readable medium of any one of the preceding Examples, wherein the second audio signals comprise supplemental audio content based at least in part on the first audio signals generated via the analog source audio component.

Example 38. The computer-readable medium of any one of the preceding Examples, wherein the first playback device further comprises a receptacle configured to removably coupled to a portable playback device, and wherein the operations further comprise: detecting that a portable playback device has been removably coupled to the receptacle; and after the detection, automatically modifying playback of audio content via at least one of the first playback device, the second playback device, or the portable playback device.

Example 39. The computer-readable medium of any one of the preceding Examples, wherein modifying playback of audio content comprises grouping the portable playback device with the first playback device for synchronous playback.

Example 40. The computer-readable medium of any one of the preceding Examples, wherein modifying playback of audio content comprises ceasing playback of audio content via the one or more audio transducers and initiating playback of corresponding audio content via the portable playback device.

Example 41. The computer-readable medium of any one of the preceding Examples, wherein the receptacle comprises a wireless charging component configured to wirelessly charge an energy storage component of the portable playback device.

Example 42. The computer-readable medium of any one of the preceding Examples, wherein the operations further comprise obtaining an automatic content recognition (ACR) determination based on the first audio signals.

Example 43. The computer-readable medium of any one of the preceding Examples, wherein the operations further comprise obtaining metadata based on the ACR determination.

Example 44. The computer-readable medium of any one of the preceding Examples, wherein the operations further comprise causing the metadata to be displayed via a controller device.

Example 45. The computer-readable medium of any one of the preceding Examples, wherein the obtaining the ACR determination comprises receiving the ACR determination from one or more remote computing devices.

Example 46. A method of playing back media content via a media playback system, the method comprising: detecting, while playing back first media content via a playback device, a trigger condition; determining, based on the detected trigger condition, one or more instructions associated with a provider of the first media content; and causing, based on the determined one or more instructions, playback of second media content via the playback device.

Example 47. The method of Example 46, wherein detecting the trigger condition comprises detecting the trigger condition while the playback device plays back the first media content via a first media content source, and wherein causing playback of the second media content comprises causing playback of the second media content via a second media content source, and wherein the first media content source is different from the second media content source.

Example 48. The method of Example 47, wherein the first media content source is a local source and wherein the second media content source is a remote source.

Example 49. The method of Example 47 or 48, wherein the first media content source comprises an analog media source.

Example 50. The method of any one of Examples 46-49, wherein detecting the trigger condition comprises detecting an indication that playback of the first media content has concluded.

Example 51. The method of Example 50, wherein detecting the indication that playback of the first media content has concluded comprises receiving sensor data indicating that playback of analog media content has ceased (e.g., stylus has reached end position).

Example 52. The method of any one of Examples 46-49, wherein detecting the trigger condition comprises detecting a time point within playback of the first media content.

Example 53. The method of any one of Examples 46-49, wherein detecting the trigger condition comprises detecting that playback has started, been paused, skipped, or resumed.

Example 54. The method of any one of Examples 46-49, wherein detecting the trigger condition comprises detecting a manual input and/or a voice command.

Example 55. The method of any one of Examples 46-54, wherein the one or more instructions associated with a provider of the first media content are embedded in a physical medium carrying the first media content (e.g., vinyl LP, cassette tape, laserdisc, etc.).

Example 56. The method of any one of Examples 46-54, wherein the one or more instructions associated with a provider of the first media content are retrieved from a lookup table (or similar data structure).

Example 57. The method of any one of Examples 47-56, wherein the second media content is related to the first media content (e.g., same artist, same album, same genre, complementary content such as commentary, etc.).

Example 58. The method of any one of Examples 46-56, wherein playback of the second media content at least partially overlaps playback of the first media content.

Example 59. A media playback system comprising: a playback device; at least one processor; and data storage comprising instructions that, when executed by the at least one processor, cause the media playback system to perform operations comprising the method of any one of Examples 46-58.

Example 60. One or more tangible, non-transitory computer-readable media storing instructions that, when executed by one or more processors of a media playback system, cause the media playback system to perform operations comprising the method of any one of Examples 46-58.

The invention claimed is:

1. A first playback device comprising:
   an analog audio source component;
   one or more audio transducers;
   a network interface;
   one or more processors; and
   data storage having instructions therein that, when executed by the one or more processors, cause the first playback device to perform operations comprising:
      generating first audio signals via the analog audio source component;
      detecting initiation of the analog audio source component;

responsive to detecting initiation of the analog audio source component, forming a synchrony group including the first playback device and a second playback device;

playing back, via the one or more audio transducers, audio based on the first audio signals generated via the analog audio source component; and transmitting, via the network interface, second audio signals based on the first audio signals generated via the analog audio source component, to the second playback device for synchronous playback.

2. The first playback device of claim 1, further comprising a receptacle configured to removably coupled to a portable playback device, wherein the operations further comprise:

detecting that a portable playback device has been removably coupled to the receptacle; and after the detection, automatically modifying playback of audio content via at least one of the first playback device, the second playback device, or the portable playback device.

3. The first playback device of claim 2, wherein modifying playback of audio content comprises grouping the portable playback device with the first playback device for synchronous playback.

4. The first playback device of claim 2, wherein modifying playback of audio content comprises ceasing playback of audio content via the one or more audio transducers and initiating playback of corresponding audio content via the portable playback device.

5. The first playback device of claim 2, wherein the receptacle comprises a wireless charging component configured to wirelessly charge an energy storage component of the portable playback device.

6. The first playback device of claim 1, wherein the operations further comprise obtaining an automatic content recognition (ACR) determination based on the first audio signals.

7. A method comprising:

generating first audio signals via an analog audio source component of a first playback device;

detecting initiation of the analog audio source component;

responsive to detecting initiation of the analog audio source component, forming a synchrony group including the first playback device and a second playback device;

playing back, via one or more audio transducers of the first playback device, audio based on the first audio signals generated via the analog audio source component; and transmitting, via a network interface of the first playback device, second audio signals based on the first audio signals generated via the analog audio source component, to the second playback device for synchronous playback.

8. The method of claim 7, wherein the first playback device further comprises a receptacle configured to removably coupled to a portable playback device, the method further comprising:

detecting that a portable playback device has been removably coupled to the receptacle; and after the detection, automatically modifying playback of audio content via at least one of the first playback device, the second playback device, or the portable playback device.

9. The method of claim 8, wherein modifying playback of audio content comprises grouping the portable playback device with the first playback device for synchronous playback.

10. The method of claim 8, wherein modifying playback of audio content comprises ceasing playback of audio content via the one or more audio transducers and initiating playback of corresponding audio content via the portable playback device.

11. The method of claim 8, wherein the receptacle comprises a wireless charging component configured to wirelessly charge an energy storage component of the portable playback device.

12. The method of claim 7, further comprising obtaining an automatic content recognition (ACR) determination based on the first audio signals.

13. A tangible, non-transitory, computer-readable medium storing instructions that, when executed by one or more processors of a first playback device, cause the first playback device to perform operations comprising:

generating first audio signals via an analog audio source component of the first playback device;

detecting initiation of the analog audio source component;

responsive to detecting initiation of the analog audio source component, forming a synchrony group including the first playback device and a second playback device;

playing back, via one or more audio transducers of the first playback device, audio based on the first audio signals generated via the analog audio source component; and transmitting, via a network interface of the first playback device, second audio signals based on the first audio signals generated via the analog audio source component, to the second playback device for synchronous playback.

14. The computer-readable medium of claim 13, wherein the first playback device further comprises a receptacle configured to removably coupled to a portable playback device, and wherein the operations further comprise:

detecting that a portable playback device has been removably coupled to the receptacle; and after the detection, automatically modifying playback of audio content via at least one of the first playback device, the second playback device, or the portable playback device.

15. The computer-readable medium of claim 14, wherein modifying playback of audio content comprises grouping the portable playback device with the first playback device for synchronous playback.

16. The computer-readable medium of claim 14, wherein modifying playback of audio content comprises ceasing playback of audio content via the one or more audio transducers and initiating playback of corresponding audio content via the portable playback device.

17. The computer-readable medium of claim 14, wherein the receptacle comprises a wireless charging component configured to wirelessly charge an energy storage component of the portable playback device.

* * * * *